United States Patent
Liang et al.

(10) Patent No.: US 10,244,513 B2
(45) Date of Patent: Mar. 26, 2019

(54) METHOD AND DEVICE FOR CONFIGURING AND SENDING UPLINK CONTROL CHANNEL, BASE STATION AND USER EQUIPMENT

(71) Applicant: ZTE CORPORATION, Shenzhen (CN)

(72) Inventors: Chunli Liang, Shenzhen (CN); Bo Dai, Shenzhen (CN); Weiwei Yang, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 112 days.

(21) Appl. No.: 15/323,251

(22) PCT Filed: Oct. 29, 2014

(86) PCT No.: PCT/CN2014/089849
§ 371 (c)(1),
(2) Date: Apr. 4, 2017

(87) PCT Pub. No.: WO2016/000368
PCT Pub. Date: Jan. 7, 2016

(65) Prior Publication Data
US 2017/0208582 A1  Jul. 20, 2017

(30) Foreign Application Priority Data
Jun. 30, 2014  (CN) .......................... 2014 1 0307862

(51) Int. Cl.
*H04W 72/04* (2009.01)
*H04W 24/00* (2009.01)
(Continued)

(52) U.S. Cl.
CPC ....... *H04W 72/0413* (2013.01); *H04L 5/0055* (2013.01); *H04L 5/14* (2013.01);
(Continued)

(58) Field of Classification Search
CPC .... H04L 5/0055; H04L 5/14; H04W 72/0413; H04W 72/0446; H04W 76/046; H04W 76/27; H04W 88/02; H04W 88/08
(Continued)

(56) References Cited

U.S. PATENT DOCUMENTS 9,374,809 B2  6/2016  Dai et al.
2013/0114472 A1*  5/2013  Tamaki ................... H04L 5/001
370/280

(Continued)

FOREIGN PATENT DOCUMENTS

CN  102355733  2/2012
CN  102647800  8/2012

(Continued)

OTHER PUBLICATIONS

International Search Report for PCT/CN2014/089849, English Translation attached to original, Both completed by the Chinese Patent Office dated Mar. 19, 2015, All together 7 pages.

(Continued)

Primary Examiner — Robert J Lopata
(74) Attorney, Agent, or Firm — Plumsea Law Group, LLC

(57) ABSTRACT

A method and apparatus for configuring and sending an uplink control channel, a base station, and a User Equipment (UE) are described. The method includes sending, by a base station, a message to a user equipment. The message is used for configuring a sending mode for a physical uplink control channel (PUCCH) of the user equipment. The sending mode includes a first sending mode in which the PUCCH is sent only on an uplink primary serving cell, and a second sending mode in which the PUCCH is sent on the uplink primary serving cell and an uplink secondary serving cell.

13 Claims, 6 Drawing Sheets

(51) Int. Cl.
*H04W 28/18* (2009.01)
*H04W 76/27* (2018.01)
*H04L 5/00* (2006.01)
*H04L 5/14* (2006.01)
*H04W 24/02* (2009.01)
*H04W 88/02* (2009.01)
*H04W 88/08* (2009.01)

(52) U.S. Cl.
CPC .......... *H04W 24/00* (2013.01); *H04W 28/18* (2013.01); *H04W 72/0446* (2013.01); *H04W 76/27* (2018.02); *H04L 5/001* (2013.01); *H04L 5/1469* (2013.01); *H04W 24/02* (2013.01); *H04W 88/02* (2013.01); *H04W 88/08* (2013.01)

(58) Field of Classification Search
USPC ........................................ 370/280
See application file for complete search history.

(56) References Cited

U.S. PATENT DOCUMENTS

| | | | | |
|---|---|---|---|---|
| 2013/0322372 A1* | 12/2013 | Kim | .................. | H04W 16/14 370/329 |
| 2014/0029558 A1* | 1/2014 | Frederiksen | ............ | H04L 5/001 370/329 |
| 2014/0161060 A1* | 6/2014 | Nam | .................. | H04L 5/0055 370/329 |
| 2015/0085774 A1 | 3/2015 | Lin et al. | | |
| 2015/0092750 A1* | 4/2015 | Huang | .................. | H04W 36/08 370/331 |
| 2015/0098441 A1* | 4/2015 | Peng | .................. | H04W 72/042 370/330 |
| 2015/0195063 A1* | 7/2015 | Ro | .................. | H04L 5/0042 370/329 |
| 2015/0215926 A1* | 7/2015 | Huang | .............. | H04W 36/0061 370/329 |
| 2015/0305016 A1* | 10/2015 | Dai | .................. | H04L 5/0053 370/280 |
| 2015/0319754 A1* | 11/2015 | Ishida | .................. | H04L 5/001 370/329 |
| 2015/0334699 A1* | 11/2015 | Uchino | .................. | H04L 5/0053 370/329 |
| 2015/0372792 A1* | 12/2015 | Damnjanovic | ....... | H04L 5/0048 370/329 |
| 2016/0014753 A1* | 1/2016 | Wu | .................. | H04B 7/022 370/280 |
| 2016/0192350 A1* | 6/2016 | Yi | .................. | H04W 52/146 370/329 |
| 2016/0330010 A1* | 11/2016 | Qin | .................. | H04L 5/0058 |
| 2017/0041865 A1* | 2/2017 | Takeda | .................. | H04W 48/18 |

FOREIGN PATENT DOCUMENTS

| | | |
|---|---|---|
| CN | 103368715 | 10/2013 |
| WO | 2011135916 | 11/2011 |

OTHER PUBLICATIONS

Extend European Search Report for EP 14896685.6, completed by the European Patent Office dated May 17, 2017 All together 11 Pages.

3GPP TSG RAN WG2 #86, Support of PUCCH on Scell for CA-RAN2 aspects, R2-141967, May 19-23, 2014, All together 10 Pages.

* cited by examiner

METHOD AND DEVICE FOR CONFIGURING AND SENDING UPLINK CONTROL CHANNEL, BASE STATION AND USER EQUIPMENT

CROSS-REFERENCE TO RELATED APPLICATION

This application is the U.S. national phase of PCT Application No. PCT/CN2014/089849 filed Oct. 29, 2014, which claims priority to Chinese Application No. 201410307862.9 filed Jun. 30, 2014, the disclosures of which are incorporated in their entirety by reference herein.

TECHNICAL FIELD

The present disclosure relates to the field of communications, and more particularly to a method and apparatus for configuring and sending an uplink control channel, a base station, and a User Equipment (UE).

BACKGROUND

In a Long Term Evolution (LTE) system, uplink channels of a terminal include a Physical Uplink Shared Channel (PUSCH), a Physical Uplink Control Channel (PUCCH) and a Physical Random Access Channel (PRACH). Further, data information, a Scheduling Request (SR), Hybrid Automatic Repeat Request Acknowledgement (HARQ-ACK) and Channel State Information (CSI) may be transferred in the PUSCH. An SR, HARQ-ACK and CSI may be transferred in the PUCCH.

In order to meet requirements of an International Telecommunication Union-Advanced (ITU-Advanced), a Long Term Evolution Advanced (LTE-A) system serving as an evolution standard for LTE needs to support a larger system bandwidth (a maximum of up to 100 MHz), and needs to be backwardly compatible with an existing standard for the LTE. On the basis of an existing LTE system, bandwidths of the LTE system may be combined to obtain a larger bandwidth. This technology is called as a Carrier Aggregation (CA) technology, and can improve the spectrum utilization rate of an International Mobile Telecommunications-Advanced (IMT-Advance) system and relieve the shortage of spectral resources, thereby optimizing the utilization of the spectral resources.

In a system to which the carrier aggregation is introduced, a carrier which is aggregated is called as a Component Carrier (CC), also as a Serving Cell (SC). Moreover, concepts of a Primary Component Carrier/Cell (PCC/PCell) and a Secondary Component Carrier/Cell (SCC/SCell) are also proposed. In a system in which the carrier aggregation is carried out, a primary serving cell and a secondary serving cell are at least contained, herein the primary serving cell is in an activated state all the time.

In an existing carrier aggregation system, when there is no PUSCH is sent simultaneously, uplink control information, including an SR, HARQ-ACK and CSI, can only be sent on a PUCCH of the PCell. There is no problem with this manner in the initial stage of the carrier aggregation.

However, the inventor of the present disclosure discovers, in a research process, that with subsequent evolution such as enhancement of small cells, a scenario where all of the small cells are non-co-located will be an important scenario of the CA. In such scenario, if the number of the small cells is huge and the PUCCH is limited to be sent only on the PCell, the overhead of the PUCCH of the PCell will become a problem.

A solution for reducing the overhead of the PUCCH of the PCell is to allow the PUCCH to be sent on the SCell. However, because the PUCCH can be sent only on the PCell in an existing carrier aggregation mechanism, when simultaneous sending of the PUCCH on the PCell and the SCell is supported, some corresponding mechanisms are required to be introduced to be capable of ensuring normal operation of terminals.

An effective solution has not been proposed yet at present for the problem that support for simultaneous sending of the PUCCH on the PCell and the SCell is not provided in the conventional art.

SUMMARY

Embodiments of the present disclosure provide a method and apparatus for configuring and sending an uplink control channel, a base station, and a user equipment, so as to at least solve the foregoing problem.

According to one aspect of embodiments of the present disclosure, a method for configuring an uplink control channel is provided and includes: sending, by a base station, a message to a user equipment, herein the message is used for configuring a sending mode for a physical uplink control channel (PUCCH) of the user equipment, and herein the sending mode includes: a first sending mode in which the PUCCH is sent only on an uplink primary serving cell, and a second sending mode in which the PUCCH is sent on the uplink primary serving cell and an uplink secondary serving cell.

In an exemplary embodiment, in a case that the sending mode for the PUCCH of the user equipment is configured as the second sending mode, the method further includes: transferring, by the base station, PUCCH-carrying uplink secondary serving cell information, first downlink serving cell information corresponding to a PUCCH-carrying uplink primary serving cell, and second downlink serving cell information corresponding to a PUCCH-carrying uplink secondary serving cell to the user equipment; and/or determining, by the user equipment, the PUCCH-carrying uplink secondary serving cell, a first downlink serving cell corresponding to the PUCCH-carrying uplink primary serving cell and a second downlink serving cell corresponding to the PUCCH-carrying uplink secondary serving cell according to a predefined rule.

In an exemplary embodiment, transferring, by the base station, the uplink secondary serving cell information, the first downlink serving cell information and the second downlink serving cell information to the user equipment includes: transferring, by the base station, the uplink secondary serving cell information, the first downlink serving cell information and the second downlink serving cell information to the user equipment through Radio Resource Control (RRC) layer signaling or Media Access Control (MAC) layer signaling, herein the uplink secondary serving cell information includes index information of the uplink secondary serving cell.

In an exemplary embodiment, the base station transfers the first downlink serving cell information and the second downlink serving cell information to the user equipment by creating a bitmap in the RRC layer signaling or the MAC layer signaling, herein a size of the bitmap is equal to a number of downlink serving cells assigned to the user equipment, and each bit in the bitmap is used for indicating whether uplink control information of a downlink serving cell corresponding to the bit is sent on the uplink primary serving cell or the uplink secondary serving cell.

In an exemplary embodiment, determining, by the user equipment, the PUCCH-carrying uplink secondary serving cell according to the predefined rule includes one of the following: determining, by the user equipment, an uplink serving cell having a minimum or maximum index number other than the uplink primary serving cell as the PUCCH-carrying uplink secondary serving cell; determining, by the user equipment, an uplink serving cell having a lowest or highest carrier frequency other than the uplink primary serving cell as the PUCCH-carrying uplink secondary serving cell; determining, by the user equipment, an uplink serving cell having a maximum bandwidth other than the uplink primary serving cell as the PUCCH-carrying uplink secondary serving cell; determining, by the user equipment, an uplink serving cell having a carrier frequency closest to or farthest from the uplink primary serving cell as the PUCCH-carrying uplink secondary serving cell; and determining, by the user equipment, an uplink serving cell containing most uplink sub-frames in uplink and downlink configurations as the PUCCH-carrying uplink secondary serving cell in a case that aggregated serving cells are Time Division Duplexing (TDD) serving cells.

In an exemplary embodiment, determining, by the user equipment, the first downlink serving cell and the second downlink serving cell according to the predefined rule includes: determining, by the user equipment, a first group of downlink serving cells as the first downlink serving cells, and determining a second group of downlink serving cells as the second downlink serving cells, herein the first group of downlink serving cells include a downlink primary serving cell, and the second group of downlink serving cells include a downlink serving cell corresponding to the PUCCH-carrying uplink secondary serving cell or a downlink serving cell meeting a predetermined uplink-downlink transmitting and receiving interval.

In a case that a number of aggregated downlink serving cells is greater than 2, the method further includes: determining a downlink serving cell belonging to the first group of downlink serving cells or the second group of downlink serving cells according to one of the following preset rules: executing a modulo-2 operation according to an index of a downlink serving cell; determining that a downlink serving cell of which a remainder is 0 belongs to the first group of downlink serving cells, and that a downlink serving cell of which a remainder is 1 belongs to the second group of downlink serving cells; determining that a downlink serving cell having a minimum index in a plurality of aggregated downlink serving cells belongs to the first group of downlink serving cells, and that the other downlink serving cells belong to the second group of downlink serving cells; determining that a downlink serving cell which is located in the same band as the downlink primary serving cell belongs to the first group of downlink serving cells, and that the other downlink serving cells belong to the second group of downlink serving cells; and determining that a downlink serving cell scheduled by the downlink primary serving cell in a cross-carrier manner belongs to the first group of downlink serving cells, and that the other downlink serving cells belong to the second group of downlink serving cells.

In an exemplary embodiment, determining, by the user equipment, the PUCCH-carrying uplink secondary serving cell, the first downlink serving cell and the second downlink serving cell according to the predefined rule includes: determining, by the user equipment, the first group of downlink serving cells as the first downlink serving cells, and determining the second group of downlink serving cells as the second downlink serving cells, herein the first group of downlink serving cells and the second group of downlink serving cells are determined according to the following preset rule: the downlink primary serving cell, downlink serving cells not corresponding to uplink serving cells and downlink serving cells corresponding to uplink serving cells are numbered sequentially as 0-N, herein N is a positive integer, downlink serving cells numbered as $0\sim[N/2]-1$ belong to the first group of downlink serving cells, and the other numbered downlink serving cells belong to the second group of downlink serving cells; in a case that a number of uplink serving cells corresponding to the second group of downlink serving cells is one, determining that uplink serving cell as the PUCCH-carrying uplink secondary serving cell; and in a case that there are a plurality of uplink serving cells corresponding to the second group of downlink serving cells, determining one of the following uplink serving cells as the PUCCH-carrying uplink secondary serving cell: an uplink serving cell corresponding to a downlink serving cell having a minimum or maximum number in the plurality of uplink serving cells; an uplink serving cell having a minimum or maximum index number in the plurality of uplink serving cells; an uplink serving cell having the highest or lowest carrier frequency in the plurality of uplink serving cells; an uplink serving cell having a maximum bandwidth in the plurality of uplink serving cells; and an uplink serving cell having the carrier frequency closest to or furthest from the uplink primary serving cell in the plurality of uplink serving cells.

In an exemplary embodiment, determining, by the user equipment, the PUCCH-carrying uplink secondary serving cell, the first downlink serving cell and the second downlink serving cell according to the predefined rule includes: determining, by the user equipment, the first group of downlink serving cells as the first downlink serving cells, and determining the second group of downlink serving cells as the second downlink serving cells, herein the first group of downlink serving cells and the second group of downlink serving cells are determined according to the following preset rule: in a case that the aggregated downlink serving cells include TDD serving cells and Frequency Division Duplexing (FDD) serving cells, determining that the first group of downlink serving cells and the second group of downlink serving cells include one or the other of the TDD serving cells or the FDD serving cells, respectively.

In an exemplary embodiment, in a case that the sending mode for the PUCCH of the user equipment is configured as the second sending mode, the method further includes: transferring, by the base station, the PUCCH-carrying uplink secondary serving cell information to the user equipment, and determining, by the user equipment, the first downlink serving cell corresponding to the PUCCH-carrying uplink primary serving cell and the second downlink serving cell corresponding to the PUCCH-carrying uplink secondary serving cell according to the predefined rule; or transferring, by the base station, the first downlink serving cell information corresponding to the PUCCH-carrying uplink primary serving cell and the second downlink serving cell information corresponding to the PUCCH-carrying uplink secondary serving cell to the user equipment, and determining, by the user equipment, the PUCCH-carrying uplink secondary serving cell according to the predefined rule.

In an exemplary embodiment, in a case that the sending mode for the PUCCH of the user equipment is configured as the second sending mode, the method further includes: configuring, by the base station, parameters for the user equipment which are required by the user equipment to send the PUCCH on the uplink secondary serving cell, herein the parameters include a newly configured PUCCH-config-SCell parameter dedicated to sending the PUCCH on the uplink secondary serving cell or an existing PUCCH-config parameter shared by the uplink primary serving cell and the uplink secondary serving cell.

According to another aspect of embodiments of the present disclosure, a method for sending an uplink control channel is further provided and includes: receiving, by a user equipment, a message sent by a base station, herein the message is used for indicating a sending mode for a physical uplink control channel (PUCCH) of the user equipment, the sending mode includes: a first sending mode in which the PUCCH is sent only on an uplink primary serving cell, and a second sending mode in which the PUCCH is sent on the uplink primary serving cell and an uplink secondary serving cell; and sending, by the user equipment, the uplink control channel according to the sending mode for the PUCCH indicated by the message.

In an exemplary embodiment, in a case that the sending mode for the PUCCH of the user equipment is configured as the second sending mode, the method further includes: receiving, by the user equipment, PUCCH-carrying uplink secondary serving cell information, first downlink serving cell information corresponding to a PUCCH-carrying uplink primary serving cell and second downlink serving cell information corresponding to a PUCCH-carrying uplink secondary serving cell, sent by the base station; and/or determining, by the user equipment, the PUCCH-carrying uplink secondary serving cell, a first downlink serving cell corresponding to the PUCCH-carrying uplink primary serving cell and a second downlink serving cell corresponding to the PUCCH-carrying uplink secondary serving cell according to a predefined rule.

In an exemplary embodiment, receiving, by the user equipment, the PUCCH-carrying uplink secondary serving cell information, the first downlink serving cell information and the second downlink serving cell information sent by the base station includes: receiving, by the user equipment, the uplink secondary serving cell information, the first downlink serving cell information and the second downlink serving cell information sent by the base station through Radio Resource Control (RRC) layer signaling or Media Access Control (MAC) layer signaling, herein the uplink secondary serving cell information includes index information of the uplink secondary serving cell.

In an exemplary embodiment, the user equipment acquires the first downlink serving cell information and the second downlink serving cell information by creating a bitmap in the RRC layer signaling or the MAC layer signaling, herein a size of the bitmap is equal to a number of downlink serving cells assigned to the user equipment, and each bit in the bitmap is used for indicating whether uplink control information of a downlink serving cell corresponding to the bit is sent on the uplink primary serving cell or the uplink secondary serving cell.

In an exemplary embodiment, determining, by the user equipment, the PUCCH-carrying uplink secondary serving cell according to the predefined rule includes one of the following: determining, by the user equipment, an uplink serving cell having a minimum or maximum index number other than the uplink primary serving cell as the PUCCH-carrying uplink secondary serving cell; determining, by the user equipment, an uplink serving cell having a lowest or highest carrier frequency other than the uplink primary serving cell as the PUCCH-carrying uplink secondary serving cell; determining, by the user equipment, an uplink serving cell having a maximum bandwidth other than the uplink primary serving cell as the PUCCH-carrying uplink secondary serving cell; determining, by the user equipment, an uplink serving cell having a carrier frequency closest to or farthest from the uplink primary serving cell as the PUCCH-carrying uplink secondary serving cell; and determining, by the user equipment, an uplink serving cell containing most uplink sub-frames in uplink and downlink configurations as the PUCCH-carrying uplink secondary serving cell in a case that aggregated serving cells are Time Division Duplexing (TDD) serving cells.

In an exemplary embodiment, determining, by the user equipment, the first downlink serving cell and the second downlink serving cell according to the predefined rule includes: determining, by the user equipment, a first group of downlink serving cells as the first downlink serving cells, and determining a second group of downlink serving cells as the second downlink serving cells, herein the first group of downlink serving cells include a downlink primary serving cell, and the second group of downlink serving cells include a downlink serving cell corresponding to the PUCCH-carrying uplink secondary serving cell or a downlink serving cell meeting a predetermined uplink-downlink transmitting and receiving interval.

In a case that a number of aggregated downlink serving cells is greater than 2, the method further includes: determining a downlink serving cell belonging to the first group of downlink serving cells or the second group of downlink serving cells according to one of the following preset rules: executing a modulo-2 operation is executed according to an index of a downlink serving cell; determining that a downlink serving cell of which a remainder is 0 belongs to the first group of downlink serving cells, and that a downlink serving cell of which a remainder is 1 belongs to the second group of downlink serving cells; determining that a downlink serving cell having a minimum index in a plurality of aggregated downlink serving cells belongs to the first group of downlink serving cells, and that the other downlink serving cells belong to the second group of downlink serving cells; determining that a downlink serving cell which is located in the same band as the downlink primary serving cell belongs to the first group of downlink serving cells, and that the other downlink serving cells belong to the second group of downlink serving cells; and determining that a downlink serving cell scheduled by the downlink primary serving cell in a cross-carrier manner belongs to the first group of downlink serving cells, and that the other downlink serving cells belong to the second group of downlink serving cells.

In an exemplary embodiment, determining, by the user equipment, the PUCCH-carrying uplink secondary serving cell, the first downlink serving cell and the second downlink serving cell according to the predefined rule includes: determining, by the user equipment, the first group of downlink serving cells as the first downlink serving cells, and determining the second group of downlink serving cells as the second downlink serving cells, herein the first group of downlink serving cells and the second group of downlink serving cells are determined according to the following preset rule: the downlink primary serving cell, downlink serving cells not corresponding to uplink serving cells and downlink serving cells corresponding to uplink serving cells are sequentially numbered as 0-N, herein N is a positive integer, downlink serving cells numbered as 0~[N/2]−1 belong to the first group of downlink serving cells, and the other numbered downlink serving cells belong to the second group of downlink serving cells; in a case that a number of uplink serving cells corresponding to the second group of downlink serving cells is one, determining that uplink serving cell as the PUCCH-carrying uplink secondary serving cell; and in a case that there are a plurality of uplink serving cells corresponding to the second group of downlink serving cells, determining one of the following uplink serving cells as the PUCCH-carrying uplink secondary serving cell: an uplink serving cell corresponding to a downlink serving cell having a minimum or maximum number in the plurality of uplink serving cells; an uplink serving cell having a minimum or maximum index number in the plurality of uplink serving cells; an uplink serving cell having a highest or lowest carrier frequency in the plurality of uplink serving cells; an uplink serving cell having a maximum bandwidth in the plurality of uplink serving cells; and an uplink serving cell having the carrier frequency closest to or furthest from the uplink primary serving cell in the plurality of uplink serving cells.

In an exemplary embodiment, determining, by the user equipment, the PUCCH-carrying uplink secondary serving cell, the first downlink serving cell and the second downlink serving cell according to the predefined rule includes: determining, by the user equipment, the first group of downlink serving cells as the first downlink serving cells, and determining the second group of downlink serving cells as the second downlink serving cells, herein the first group of downlink serving cells and the second group of downlink serving cells are determined according to the following preset rule: in a case that the aggregated downlink serving cells include TDD serving cells and Frequency Division Duplexing (FDD) serving cells, determining that the first group of downlink serving cells and the second group of downlink serving cells include one or the other of the TDD serving cells or the FDD serving cells, respectively.

In an exemplary embodiment, in a case that the sending mode for the PUCCH of the user equipment is configured as the second sending mode, the method further includes: transferring, by the base station, the PUCCH-carrying uplink secondary serving cell information to the user equipment, and determining, by the user equipment, the first downlink serving cell corresponding to the PUCCH-carrying uplink primary serving cell and the second downlink serving cell corresponding to the PUCCH-carrying uplink secondary serving cell according to the predefined rule; or transferring, by the base station, the first downlink serving cell information corresponding to the PUCCH-carrying uplink primary serving cell and the second downlink serving cell information corresponding to the PUCCH-carrying uplink secondary serving cell to the user equipment, and determining, by the user equipment, the PUCCH-carrying uplink secondary serving cell according to the predefined rule.

In an exemplary embodiment, in a case that the sending mode for the PUCCH of the user equipment is configured as the second sending mode, the method further includes: receiving, by the user equipment, RRC layer configuration parameters of the PUCCH-carrying uplink secondary serving cell, herein the configuration parameters include at least one of the following: an ACK/NACK and CQI simultaneous transmission configuration parameter simultaneousAckNackAndCQI, a format3-based ACK/NACK and CQI simultaneous transmission configuration parameter simultaneousAckNackAndCQI-format3, and an ACK/NACK and SRS simultaneous transmission configuration parameter ackNackSRS-SimultaneousTransmission.

In an exemplary embodiment, in a case that the sending mode for the PUCCH of the user equipment is configured as the second sending mode, the method further includes: determining, by the user equipment, that one of the RRC layer configuration parameters simultaneousAckNackAndCQI-format3 corresponding to the uplink primary serving cell and the uplink secondary serving cell respectively for sending the PUCCH is enabled while the other one is not enabled; in a case that both HARQ-ACK and CSI needs to be sent on the PUCCH of the uplink serving cell of which simultaneousAckNackAndCQI-format3 is not enabled and only the HARQ-ACK needs to be sent on the PUCCH of the uplink serving cell of which simultaneousAckNackAndCQI-format3 is enabled, putting, by the user equipment, P-CSI needing to be sent on the serving cell of which simultaneousAckNackAndCQI-format3 is not enabled on the serving cell of which simultaneousAckNackAndCQI-format3 is enabled, and simultaneously sending the P-CSI and the HARQ-ACK on the serving cell of which simultaneousAckNackAndCQI-format3 is enabled.

According to another aspect of embodiments of the present disclosure, an apparatus for configuring an uplink control channel is further provided and includes: a sending module arranged to send a message from a base station to a user equipment, herein the message is used for configuring a sending mode for a physical uplink control channel (PUCCH) of the user equipment, and herein the sending mode includes: a first sending mode in which the PUCCH is sent only on an uplink primary serving cell, and a second sending mode in which the PUCCH is sent on the uplink primary serving cell and an uplink secondary serving cell.

In an exemplary embodiment, the apparatus further includes a transferring module arranged to transfer PUCCH-carrying uplink secondary serving cell information, first downlink serving cell information corresponding to a PUCCH-carrying uplink primary serving cell, and second downlink serving cell information corresponding to a PUCCH-carrying uplink secondary serving cell to the user equipment.

In an exemplary embodiment, the transferring module is further arranged to transfer the uplink secondary serving cell information, the first downlink serving cell information and the second downlink serving cell information to the user equipment through Radio Resource Control (RRC) layer signaling or Media Access Control (MAC) layer signaling, herein the uplink secondary serving cell information includes index information of the uplink secondary serving cell.

In an exemplary embodiment, the transferring module is further arranged to transfer the first downlink serving cell information and the second downlink serving cell information to the user equipment by creating a bitmap in the RRC layer signaling or the MAC layer signaling, herein a size of the bitmap is equal to a number of downlink serving cells assigned to the user equipment, and each bit in the bitmap is used for indicating whether uplink control information of a downlink serving cell corresponding to the bit is sent on the uplink primary serving cell or the uplink secondary serving cell.

In an exemplary embodiment, the apparatus further includes a configuration module arranged to configure parameters for the user equipment which are required by the user equipment to send the PUCCH on the uplink secondary serving cell, herein the parameters include a newly configured PUCCH-config-SCell parameter dedicated to sending the PUCCH on the uplink secondary serving cell or an existing PUCCH-config parameter shared by the uplink primary serving cell and the uplink secondary serving cell.

According to another aspect of embodiments of the present disclosure, an apparatus for sending an uplink control channel is further provided and includes: a first receiving module arranged to receive a message sent by a base station, herein the message is used for indicating a sending mode for a physical uplink control channel (PUCCH) of the user equipment, the sending mode includes: a first sending mode in which the PUCCH is sent only on an uplink primary serving cell, and a second sending mode in which the PUCCH is sent on the uplink primary serving cell and an uplink secondary serving cell; and a first sending module arranged to send the uplink control channel according to the sending mode for the PUCCH indicated by the message.

In an exemplary embodiment, the apparatus further includes a second receiving module arranged to receive PUCCH-carrying uplink secondary serving cell information, first downlink serving cell information corresponding to a PUCCH-carrying uplink primary serving cell, and second downlink serving cell information corresponding to a PUCCH-carrying uplink secondary serving cell, sent by the base station; and/or a second determination module arranged to determine the PUCCH-carrying uplink secondary serving cell, a first downlink serving cell corresponding to the PUCCH-carrying uplink primary serving cell, and a second downlink serving cell corresponding to the PUCCH-carrying uplink secondary serving cell according to a predefined rule.

In an exemplary embodiment, the second receiving module is further arranged to receive the uplink secondary serving cell information, the first downlink serving cell information and the second downlink serving cell information sent by the base station through Radio Resource Control (RRC) layer signaling or Media Access Control (MAC) layer signaling, herein the uplink secondary serving cell information includes index information of the uplink secondary serving cell.

In an exemplary embodiment, the second receiving module is further arranged to acquire the first downlink serving cell information and the second downlink serving cell information by creating a bitmap in the RRC layer signaling or the MAC layer signaling, herein a size of the bitmap is equal to a number of downlink serving cells assigned to the user equipment, and each bit in the bitmap is used for indicating whether uplink control information of a downlink serving cell corresponding to the bit is sent on the uplink primary serving cell or the uplink secondary serving cell.

In an exemplary embodiment, the second determination module includes one of the following: a first determination unit arranged to determine an uplink serving cell having a minimum or maximum index number other than the uplink primary serving cell as the PUCCH-carrying uplink secondary serving cell; a second determination unit arranged to determine an uplink serving cell having a lowest or highest carrier frequency other than the uplink primary serving cell as the PUCCH-carrying uplink secondary serving cell; a third determination unit arranged to determine an uplink serving cell having a maximum bandwidth other than the uplink primary serving cell as the PUCCH-carrying uplink secondary serving cell; a fourth determination unit arranged to determine an uplink serving cell having a carrier frequency closest to or farthest from the uplink primary serving cell as the PUCCH-carrying uplink secondary serving cell; and a fifth determination unit arranged to determine an uplink serving cell containing most uplink sub-frames in uplink and downlink configurations as the PUCCH-carrying uplink secondary serving cell in a case that aggregated serving cells are Time Division Duplexing (TDD) serving cells.

In an exemplary embodiment, the second determination module includes a sixth determination unit arranged to determine a first group of downlink serving cells as the first downlink serving cells, and determine a second group of downlink serving cells as the second downlink serving cells, herein the first group of downlink serving cells include a downlink primary serving cell, and the second group of downlink serving cells include a downlink serving cell corresponding to the PUCCH-carrying uplink secondary serving cell or a downlink serving cell meeting a predetermined uplink-downlink transmitting and receiving interval.

The second determination module further includes one of the following: a seventh determination unit arranged to execute a modulo-2 operation according to an index of an downlink serving cell, determine that a downlink serving cell of which a remainder is 0 belongs to the first group of downlink serving cells, and determine that a downlink serving cell of which a remainder is 1 belongs to the second group of downlink serving cells; an eighth determination unit arranged to determine that a downlink serving cell having a minimum index in a plurality of aggregated downlink serving cells belongs to the first group of downlink serving cells, and determine that the other downlink serving cells belong to the second group of downlink serving cells; a ninth determination unit arranged to determine that a downlink serving cell which is located in the same band as the downlink primary serving cell belongs to the first group of downlink serving cells, and determine that the other downlink serving cells belong to the second group of downlink serving cells; and a tenth determination unit arranged to determine that a downlink serving cell scheduled by the downlink primary serving cell in a cross-carrier manner belongs to the first group of downlink serving cells, and determine that the other downlink serving cells belong to the second group of downlink serving cells.

In an exemplary embodiment, the second determination module includes an eleventh determination unit arranged to determine the first group of downlink serving cells as the first downlink serving cells, and determine the second group of downlink serving cells as the second downlink serving cells, herein the first group of downlink serving cells and the second group of downlink serving cells are determined according to the following preset rule: the downlink primary serving cell, downlink serving cells not corresponding to uplink serving cells and downlink serving cells corresponding to uplink serving cells are sequentially numbered as 0-N, herein N is a positive integer, downlink serving cells numbered as $0 \sim \lfloor N/2 \rfloor - 1$ belong to the first group of downlink serving cells, and the other numbered downlink serving cells belong to the second group of downlink serving cells; a twelfth determination unit arranged to determine, in a case that a number of uplink serving cells corresponding to the second group of downlink serving cells is one, determine that uplink serving cell as the PUCCH-carrying uplink secondary serving cell; and a thirteenth determination unit arranged to determine, in a case that there are a plurality of uplink serving cells corresponding to the second group of downlink serving cells, one of the following uplink serving cells as the PUCCH-carrying uplink secondary serving cell: an uplink serving cell corresponding to a downlink serving cell having a minimum or maximum number in the plurality of uplink serving cells; an uplink serving cell having a minimum or maximum index number in the plurality of uplink serving cells; an uplink serving cell having a highest or lowest carrier frequency in the plurality of uplink serving cells; an uplink serving cell having a maximum bandwidth in the plurality of uplink serving cells; and an uplink serving cell having a carrier frequency closest to or furthest from the uplink primary serving cell in the plurality of uplink serving cells.

In an exemplary embodiment, the second determination module is further arranged to determine the first group of downlink serving cells as the first downlink serving cells, and determine the second group of downlink serving cells as the second downlink serving cells, herein the first group of downlink serving cells and the second group of downlink serving cells are determined according to the following preset rule: in a case that the aggregated downlink serving cells include the TDD serving cells and Frequency Division Duplexing (FDD) serving cells, determining that the first group of downlink serving cells and the second group of downlink serving cells include one or the other of the TDD serving cells or the FDD serving cells, respectively.

In an exemplary embodiment, the apparatus further includes a third receiving module arranged to receive and configure RRC layer configuration parameters of the PUCCH-carrying uplink secondary serving cell, herein the configuration parameters include at least one of the following: an ACK/NACK and CQI simultaneous transmission configuration parameter simultaneousAckNackAndCQI, a format3-based ACK/NACK and CQI simultaneous transmission configuration parameter simultaneousAckNack-AndCQI-format3, and an ACK/NACK and SRS simultaneous transmission configuration parameter ackNackSRS-SimultaneousTransmission.

In an exemplary embodiment, the apparatus further includes a third determination module arranged to determine that one of the RRC layer configuration parameters simultaneousAckNackAndCQI-format3 corresponding to the uplink primary serving cell and the uplink secondary serving cell respectively for sending the PUCCH is enabled while the other one is not enabled; and a second sending module arranged to, put, in a case that both HARQ-ACK and CSI needs to be sent on the PUCCH of the uplink serving cell of which simultaneousAckNackAndCQI-format3 is not enabled and only the HARQ-ACK needs to be sent on the PUCCH of the uplink serving cell of which simultaneousAckNackAndCQI-format3 is enabled, P-CSI needing to be sent on the serving cell of which simultaneousAckNack-AndCQI-format3 is not enabled on the serving cell of which simultaneousAckNackAndCQI-format3 is enabled, and simultaneously send the P-CSI and the HARQ-ACK on the serving cell of which simultaneousAckNackAndCQI-format3 is enabled.

According to another aspect of embodiments of the present disclosure, a base station is further provided and includes the foregoing apparatus for configuring an uplink control channel.

According to another aspect of embodiments of the present disclosure, a user equipment is further provided and includes the foregoing apparatus for sending an uplink control channel.

Through the embodiments of the present disclosure, a manner in which the base station sends the message configuring the sending mode for the PUCCH of the user equipment to the user equipment is used, so as to solve the problem in the conventional art that support for simultaneous sending of the PUCCH on the PCell and the SCell is not provided, thereby achieving the simultaneous sending of the PUCCH on the PCell and the SCell.

BRIEF DESCRIPTION OF DRAWINGS

The accompanying drawings described herein are intended to provide further understanding of the present disclosure, and form part of the present application. The schematic embodiments and descriptions of the present disclosure are intended to explain the present disclosure, and do not form improper limitations to the present disclosure. In the drawings.

SPECIFIC EMBODIMENTS

Figure 1:
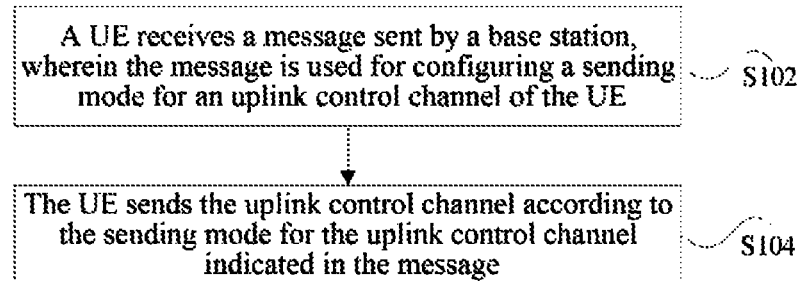
FIG. 1 is a flowchart of a method for sending an uplink control channel according to an embodiment of the present disclosure.

It should be noted that embodiments in the present application and features in the embodiments may be combined with each other in the case of no conflict. The present disclosure will be elaborated below with reference to the accompanying drawings and in combination with the embodiments.

The steps shown in a flowchart of the accompanying drawings may be executed in a computer system, such as a set of computer-executable instructions. Moreover, although a logic sequence is shown in the flowchart, the shown or described steps may be executed in an order different from that shown herein in some cases.

The present embodiment provides a method for configuring an uplink control channel, which includes a base station sending a message to a user equipment, herein the message is used for configuring a sending mode for a PUCCH of the user equipment.

The sending mode for the PUCCH is used for indicating an uplink serving cell for sending the PUCCH. For example, the sending mode includes a first sending mode in which the PUCCH is sent only on an uplink primary serving cell, and a second sending mode in which the PUCCH is sent on the uplink primary serving cell and an uplink secondary serving cell.

Through the foregoing step, a manner in which the base station sends the message configuring the sending mode for the PUCCH of the user equipment to the user equipment (i.e., terminal or communication device) is used, such that the base station and the user equipment may negotiate with each other through the sending mode for the PUCCH, and the problem in the conventional art that support for simultaneous sending of the PUCCH on a PCell and an SCell is not provided is solved, thereby achieving the simultaneous sending of the PUCCH on the PCell and the SCell.

Alternatively, in the case that the sending mode for the PUCCH of the user equipment is configured as the second sending mode, necessary serving cell information may be transferred using at least the following two manners or combination of the two manners.

For example, in manner 1, the base station transfers PUCCH-carrying uplink secondary serving cell information, first downlink serving cell information corresponding to a PUCCH-carrying uplink primary serving cell and second downlink serving cell information corresponding to a PUCCH-carrying uplink secondary serving cell to the user equipment.

In manner 2, the user equipment determines the PUCCH-carrying uplink secondary serving cell, a first downlink serving cell corresponding to the PUCCH-carrying uplink primary serving cell and a second downlink serving cell corresponding to the PUCCH-carrying uplink secondary serving cell according to a predefined rule.

In the case that manner 1 is used, alternatively, the base station transfers the uplink secondary serving cell information, the first downlink serving cell information and the second downlink serving cell information to the user equipment through RRC layer signaling or MAC layer signaling, herein the uplink secondary serving cell information includes index information of the uplink secondary serving cell.

Alternatively, in the case that the serving cell information is transferred through the RRC layer signaling or the MAC layer signaling, the serving cell information may be encoded in a bitmap manner. For example, the base station transfers the first downlink serving cell information and the second downlink serving cell information to the user equipment by creating a bitmap in the RRC layer signaling or the MAC layer signaling, herein the size of the bitmap is equal to the number of downlink serving cells assigned to the user equipment, and each bit in the bitmap is used for indicating whether uplink control information of a downlink serving cell corresponding to the bit is sent on the uplink primary serving cell or the uplink secondary serving cell.

In the case that manner 2 is used, alternatively, determining, by the user equipment, the PUCCH-carrying uplink secondary serving cell according to the predefined rule includes one of the following configurations to be chosen:

1. the user equipment determines an uplink serving cell having the minimum or maximum index number other than the uplink primary serving cell as the PUCCH-carrying uplink secondary serving cell;

2. the user equipment determines an uplink serving cell having the lowest or highest carrier frequency other than the uplink primary serving cell as the PUCCH-carrying uplink secondary serving cell;

3. the user equipment determines an uplink serving cell having the maximum bandwidth other than the uplink primary serving cell as the PUCCH-carrying uplink secondary serving cell;

4. the user equipment determines an uplink serving cell having the carrier frequency closest to or farthest from the uplink primary serving cell as the PUCCH-carrying uplink secondary serving cell; and 5. the user equipment determines an uplink serving cell containing most uplink sub-frames in uplink and downlink configurations as the PUCCH-carrying uplink secondary serving cell in the case that aggregated serving cells are TDD serving cells.

In the case that manner 2 is used, alternatively, the user equipment may determines the first downlink serving cell and the second downlink serving cell according to the predefined rule by determining a first group of downlink serving cells as the first downlink serving cells and determining a second group of downlink serving cells as the second downlink serving cells, herein the first group of downlink serving cells includes a downlink primary serving cell, and the second group of downlink serving cells includes a downlink serving cell corresponding to the PUCCH-carrying uplink secondary serving cell or a downlink serving cell meeting a predetermined uplink-downlink transmitting and receiving interval.

In the case that the number of aggregated downlink serving cells is greater than 2, the method user equipment determines downlink serving cells belonging to the first group of downlink serving cells or the second group of downlink serving cells according to one of the following preset rules:

1. a modulo-2 operation is executed according to indexes of the downlink serving cells; it is determined that a downlink serving cell of which the remainder is 0 belongs to the first group of downlink serving cells, and that a downlink serving cell of which the remainder is 1 belongs to the second group of downlink serving cells;

2. it is determined that a downlink serving cell having the minimum index in a plurality of aggregated downlink serving cells belongs to the first group of downlink serving cells, and that the other downlink serving cells belong to the second group of downlink serving cells;

3. it is determined that downlink serving cells which are located in the same band as the downlink primary serving cell belong to the first group of downlink serving cells, and that the other downlink serving cells belong to the second group of downlink serving cells; and 4. it is determined that downlink serving cells scheduled by the downlink primary serving cell in a cross-carrier manner belong to the first group of downlink serving cells, and that the other downlink serving cells belong to the second group of downlink serving cells.

Alternatively, determining, by the user equipment, the PUCCH-carrying uplink secondary serving cell, the first downlink serving cell and the second downlink serving cell according to the predefined rule includes: determining, by the user equipment, the first group of downlink serving cells as the first downlink serving cells, and determining the second group of downlink serving cells as the second downlink serving cells, herein the first group of downlink serving cells and the second group of downlink serving cells are determined according to the following preset rule: the downlink primary serving cell, downlink serving cells not corresponding to uplink serving cells and downlink serving cells corresponding to uplink serving cells are sequentially numbered as 0-N, herein N is a positive integer, downlink serving cells numbered as 0~⌊N/2⌋−1 belong to the first group of downlink serving cells, and the other numbered downlink serving cells belong to the second group of downlink serving cells.

In the case that the number of uplink serving cells corresponding to the second group of downlink serving cells is one, that uplink serving cell is determined as the PUCCH-carrying uplink secondary serving cell.

In the case that there are a plurality of uplink serving cells corresponding to the second group of downlink serving cells, one of the following uplink serving cells is determined as the PUCCH-carrying uplink secondary serving cell: an uplink serving cell corresponding to a downlink serving cell having the minimum or maximum number in the plurality of uplink serving cells; an uplink serving cell having the minimum or maximum index number in the plurality of uplink serving cells; an uplink serving cell having the highest or lowest carrier frequency in the plurality of uplink serving cells; an uplink serving cell having the maximum bandwidth in the plurality of uplink serving cells; and an uplink serving cell having the carrier frequency closest to or furthest from the uplink primary serving cell in the plurality of uplink serving cells.

Alternatively, determining, by the user equipment, the PUCCH-carrying uplink secondary serving cell, the first downlink serving cell and the second downlink serving cell according to the predefined rule includes: determining, by the user equipment, the first group of downlink serving cells as the first downlink serving cells, and determining the second group of downlink serving cells as the second downlink serving cells, herein the first group of downlink serving cells and the second group of downlink serving cells are determined according to the following preset rule: in the case that the aggregated downlink serving cells include the TDD serving cells and FDD serving cells, it is determined that the first group of downlink serving cells and the second group of downlink serving cells include one or the other of the TDD serving cells or the FDD serving cells, respectively.

Alternatively, in the case that the sending mode for the PUCCH of the user equipment is configured as the second sending mode, the base station transfers the PUCCH-carrying uplink secondary serving cell information to the user equipment, and the user equipment determines the first downlink serving cell corresponding to the PUCCH-carrying uplink primary serving cell and the second downlink serving cell corresponding to the PUCCH-carrying uplink secondary serving cell according to the predefined rule; or the base station transfers the first downlink serving cell information corresponding to the PUCCH-carrying uplink primary serving cell and the second downlink serving cell information corresponding to the PUCCH-carrying uplink secondary serving cell to the user equipment, and the user equipment determines the PUCCH-carrying uplink secondary serving cell according to the predefined rule.

Alternatively, in the case that the sending mode for the PUCCH of the user equipment is configured as the second sending mode, the base station configures parameters for the user equipment which are required by the user equipment to send the PUCCH on the uplink secondary serving cell, herein the parameters include a newly configured PUCCH-config-SCell parameter dedicated to sending the PUCCH on the uplink secondary serving cell or an existing PUCCH-config parameter shared by the uplink primary serving cell and the uplink secondary serving cell.

The present embodiment further provides a method for sending an uplink control channel. FIG. 1 is a flowchart of a method for sending an uplink control channel according to an embodiment of the present disclosure. As shown in FIG. 1, the flow includes the following steps.

In step S102, a user equipment receives a message sent by a base station, herein the message is used for indicating a sending mode for a PUCCH of the user equipment.

In step S104, the user equipment sends the uplink control channel according to the sending mode indicated by the message.

The sending mode for the PUCCH includes: a first sending mode in which the PUCCH is sent only on an uplink primary serving cell, and a second sending mode in which the PUCCH is sent on the uplink primary serving cell and an uplink secondary serving cell.

Alternatively, in the case that the sending mode for the PUCCH of the user equipment is configured as the second sending mode, necessary serving cell information may be transferred using at least the following two manners or combination of the two manners.

In manner 1, the user equipment receives PUCCH-carrying uplink secondary serving cell information, first downlink serving cell information corresponding to a PUCCH-carrying uplink primary serving cell and second downlink serving cell information corresponding to a PUCCH-carrying uplink secondary serving cell, sent by the base station.

In manner 2, the user equipment determines the PUCCH-carrying uplink secondary serving cell, a first downlink serving cell corresponding to the PUCCH-carrying uplink primary serving cell and a second downlink serving cell corresponding to the PUCCH-carrying uplink secondary serving cell according to a predefined rule.

In the case that manner 1 is used, alternatively, receiving, by the user equipment, the PUCCH-carrying uplink secondary serving cell information, the first downlink serving cell information and the second downlink serving cell information sent by the base station includes: receiving, by the user equipment, the uplink secondary serving cell information, the first downlink serving cell information and the second downlink serving cell information sent by the base station through RRC layer signaling or MAC layer signaling, herein the uplink secondary serving cell information includes index information of the uplink secondary serving cell.

The user equipment acquires the first downlink serving cell information and the second downlink serving cell information by creating a bitmap in the RRC layer signaling or the MAC layer signaling, herein the size of the bitmap is equal to the number of downlink serving cells assigned to the user equipment, and each bit in the bitmap is used for indicating whether uplink control information of a downlink serving cell corresponding to the bit is sent on the uplink primary serving cell or the uplink secondary serving cell.

Alternatively, determining, by the user equipment, the PUCCH-carrying uplink secondary serving cell according to the predefined rule includes one of the following manners:

1. the user equipment determines an uplink serving cell having the minimum or maximum index number other than the uplink primary serving cell as the PUCCH-carrying uplink secondary serving cell;

2. the user equipment determines an uplink serving cell having the lowest or highest carrier frequency other than the uplink primary serving cell as the PUCCH-carrying uplink secondary serving cell;

3. the user equipment determines an uplink serving cell having the maximum bandwidth other than the uplink primary serving cell as the PUCCH-carrying uplink secondary serving cell;

4. the user equipment determines an uplink serving cell having the carrier frequency closest to or farthest from the uplink primary serving cell as the PUCCH-carrying uplink secondary serving cell; and 5. the user equipment determines an uplink serving cell containing most uplink sub-frames in uplink and downlink configurations as the PUCCH-carrying uplink secondary serving cell in the case that aggregated serving cells are TDD serving cells.

Alternatively, determining, by the user equipment, the first downlink serving cell and the second downlink serving cell according to the predefined rule includes: determining, by the user equipment, a first group of downlink serving cells as the first downlink serving cells, and determining a second group of downlink serving cells as the second downlink serving cells, herein the first group of downlink serving cells includes a downlink primary serving cell, and the second group of downlink serving cells includes a downlink serving cell corresponding to the PUCCH-carrying uplink secondary serving cell or a downlink serving cell meeting a predetermined uplink-downlink transmitting and receiving interval.

In the case that the number of aggregated downlink serving cells is greater than 2, the user equipment determines downlink serving cells belonging to the first group of downlink serving cells or the second group of downlink serving cells according to one of the following preset rules:

1. a modulo-2 operation is executed according to indexes of the downlink serving cells; it is determined that a downlink serving cell of which the remainder is 0 belongs to the first group of downlink serving cells, and it is determined that a downlink serving cell of which the remainder is 1 belongs to the second group of downlink serving cells;

2. it is determined that a downlink serving cell having the minimum index in a plurality of aggregated downlink serving cells belongs to the first group of downlink serving cells, and that the other downlink serving cells belong to the second group of downlink serving cells;

3. it is determined that downlink serving cells which are located in the same band as the downlink primary serving cell belong to the first group of downlink serving cells, and that the other downlink serving cells belong to the second group of downlink serving cells; and 4. it is determined that downlink serving cells scheduled by the downlink primary serving cell in a cross-carrier manner belong to the first group of downlink serving cells, and that the other downlink serving cells belong to the second group of downlink serving cells.

Alternatively, determining, by the user equipment, the PUCCH-carrying uplink secondary serving cell, the first downlink serving cell and the second downlink serving cell according to the predefined rule includes: determining, by the user equipment, the first group of downlink serving cells as the first downlink serving cells, and determining the second group of downlink serving cells as the second downlink serving cells, herein the first group of downlink serving cells and the second group of downlink serving cells are determined according to the following preset rule: the downlink primary serving cell, downlink serving cells not corresponding to uplink serving cells and downlink serving cells corresponding to uplink serving cells are sequentially numbered as 0-N, herein N is a positive integer, downlink serving cells numbered as 0~[N/2]−1 belong to the first group of downlink serving cells, and the other numbered downlink serving cells belong to the second group of downlink serving cells.

In the case that the number of uplink serving cells corresponding to the second group of downlink serving cells is one, that uplink serving cell is determined as the PUCCH-carrying uplink secondary serving cell.

In the case that there are a plurality of uplink serving cells corresponding to the second group of downlink serving cells, one of the following uplink serving cells is determined as the PUCCH-carrying uplink secondary serving cell: an uplink serving cell corresponding to a downlink serving cell having the minimum or maximum number in the plurality of uplink serving cells; an uplink serving cell having the minimum or maximum index number in the plurality of uplink serving cells; an uplink serving cell having the highest or lowest carrier frequency in the plurality of uplink serving cells; an uplink serving cell having the maximum bandwidth in the plurality of uplink serving cells; and an uplink serving cell having the carrier frequency closest to or furthest from the uplink primary serving cell in the plurality of uplink serving cells.

Alternatively, determining, by the user equipment, the PUCCH-carrying uplink secondary serving cell, the first downlink serving cell and the second downlink serving cell according to the predefined rule includes: determining, by the user equipment, the first group of downlink serving cells as the first downlink serving cells, and determining the second group of downlink serving cells as the second downlink serving cells, herein the first group of downlink serving cells and the second group of downlink serving cells are determined according to the following preset rule: in the case that the aggregated downlink serving cells include the TDD serving cells and FDD serving cells, it is determined that the first group of downlink serving cells and the second group of downlink serving cells include one or the other of the TDD serving cells or the FDD serving cells, respectively.

Alternatively, in the case that the sending mode for the PUCCH of the user equipment is configured as the second sending mode, the base station transfers the PUCCH-carrying uplink secondary serving cell information to the user equipment, and the user equipment determines the first downlink serving cell corresponding to the PUCCH-carrying uplink primary serving cell and the second downlink serving cell corresponding to the PUCCH-carrying uplink secondary serving cell according to the predefined rule; or the base station, transfers the first downlink serving cell information corresponding to the PUCCH-carrying uplink primary serving cell and the second downlink serving cell information corresponding to the PUCCH-carrying uplink secondary serving cell to the user equipment, and the determines user equipment, the PUCCH-carrying uplink secondary serving cell according to the predefined rule.

Alternatively, in the case that the sending mode for the PUCCH of the user equipment is configured as the second sending mode, the user equipment receives RRC layer configuration parameters of the PUCCH-carrying uplink secondary serving cell, herein the configuration parameters include at least one of the following: an ACK/NACK and CQI simultaneous transmission configuration parameter simultaneousAckNackAndCQI, a format3-based ACK/NACK and CQI simultaneous transmission configuration parameter simultaneousAckNackAndCQI-format3, and an ACK/NACK and SRS simultaneous transmission configuration parameter ackNackSRS-SimultaneousTransmission. These configuration parameters may be specifically defined with reference to 3GPP TS36.331.

Alternatively, in the case that the sending mode for the PUCCH of the user equipment is configured as the second sending mode, the user equipment determines that one of the RRC layer configuration parameters simultaneousAckNack-AndCQI-format3 corresponding to the uplink primary serving cell and the uplink secondary serving cell for sending the PUCCH is enabled while the other one is not enabled; the user equipment simultaneously sends HARQ-ACK and CSI on the PUCCH of the uplink serving cell of which simultaneousAckNackAndCQI-format3 is not enabled, and in the case that only the HARQ-ACK is sent on the PUCCH of the uplink serving cell of which simultaneousAckNackAndCQI-format3 is enabled, the user equipment puts P-CSI needing to be sent on the serving cell of which simultaneousAckNackAndCQI-format3 is not enabled on the serving cell of which simultaneousAckNackAndCQI-format3 is enabled, and simultaneously sends the P-CSI and the HARQ-ACK.

The present embodiment further provides an apparatus for configuring an uplink control channel, located in a base station. The apparatus is used to implement the method for configuring the uplink control channel described above. It should be noted that the apparatus for configuring the uplink control channel described in the apparatus embodiment corresponds to the embodiment of the foregoing method for configuring the uplink control channel. Structures of specific modules or units in the apparatus may not be well known, but can be implemented easily by those skilled in the art with reference to the well know art and the technical contents disclosed in the embodiments of present disclosure.

The apparatus for configuring the uplink control channel provided by the embodiment includes: a sending module arranged to send a message from a base station to a user equipment, herein the message is used for configuring a sending mode for a physical uplink control channel (PUCCH) of the user equipment.

The sending mode for the PUCCH includes: a first sending mode in which the PUCCH is sent only on an uplink primary serving cell, and a second sending mode in which the PUCCH is sent on the uplink primary serving cell and an uplink secondary serving cell.

Alternatively, the apparatus further includes a transferring module arranged to transfer PUCCH-carrying uplink secondary serving cell information, first downlink serving cell information corresponding to a PUCCH-carrying uplink primary serving cell and second downlink serving cell information corresponding to a PUCCH-carrying uplink secondary serving cell to the user equipment.

Alternatively, the transferring module is further arranged to transfer the uplink secondary serving cell information, the first downlink serving cell information and the second downlink serving cell information to the user equipment through RRC layer signaling or MAC layer signaling, herein the uplink secondary serving cell information includes index information of the uplink secondary serving cell.

Alternatively, the transferring module is further arranged to transfer the first downlink serving cell information and the second downlink serving cell information to the user equipment by creating a bitmap in the RRC layer signaling or the MAC layer signaling, herein the size of the bitmap is equal to the number of downlink serving cells assigned to the user equipment, and each bit in the bitmap is used for indicating whether uplink control information of a downlink serving cell corresponding to the bit is sent on the uplink primary serving cell or the uplink secondary serving cell.

Alternatively, the apparatus further includes a configuration module arranged to configure parameters for the user equipment which are required by the user equipment to send the PUCCH on the uplink secondary serving cell, herein the parameters include a newly configured PUCCH-config-SCell parameter dedicated to sending the PUCCH on the uplink secondary serving cell or an existing PUCCH-config parameter shared by the uplink primary serving cell and the uplink secondary serving cell.

Figure 2:
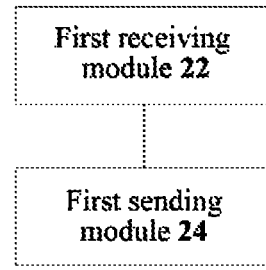
FIG. 2 is a structural diagram of an apparatus for sending an uplink control channel according to an embodiment of the present disclosure.

The present embodiment further provides an apparatus for sending an uplink control channel, located in a user equipment. The apparatus is used to implement the method for sending the uplink control channel. FIG. 2 is a structural diagram of an apparatus for sending an uplink control channel according to an embodiment of the present disclosure. As shown in FIG. 2, the foregoing apparatus for sending the uplink control channel includes a first receiving module 22 and a first sending module 24. The first receiving module 22 arranged to receive a message sent by a base station, herein the message is used for indicating a sending mode for a physical uplink control channel (PUCCH) of the user equipment; and a first sending module 24 is coupled to the first receiving module 22 and arranged to send the uplink control channel according to the sending mode indicated by the message.

The sending mode including: a first sending mode in which the PUCCH is sent only on an uplink primary serving cell, and a second sending mode in which the PUCCH is sent on the uplink primary serving cell and an uplink secondary serving cell.

Alternatively, the apparatus further includes a second receiving module arranged to receive PUCCH-carrying uplink secondary serving cell information, first downlink serving cell information corresponding to a PUCCH-carrying uplink primary serving cell and second downlink serving cell information corresponding to a PUCCH-carrying uplink secondary serving cell, sent by the base station; and/or a second determination module arranged to determine the PUCCH-carrying uplink secondary serving cell, a first downlink serving cell corresponding to the PUCCH-carrying uplink primary serving cell and a second downlink serving cell corresponding to the PUCCH-carrying uplink secondary serving cell according to a predefined rule.

Alternatively, the second receiving module is further arranged to receive the uplink secondary serving cell information, the first downlink serving cell information and the second downlink serving cell information sent by the base station through RRC layer signaling or MAC layer signaling, herein the uplink secondary serving cell information includes index information of the uplink secondary serving cell.

Alternatively, the second receiving module is further arranged to acquire the first downlink serving cell information and the second downlink serving cell information by creating a bitmap in the RRC layer signaling or the MAC layer signaling, herein the size of the bitmap is equal to the number of downlink serving cells assigned to the user equipment, and each bit in the bitmap is used for indicating whether uplink control information of a downlink serving cell corresponding to the bit is sent on the uplink primary serving cell or the uplink secondary serving cell.

Alternatively, the second determination module includes one of the following: a first determination unit arranged to determine an uplink serving cell having the minimum or maximum index number other than the uplink primary serving cell as the PUCCH-carrying uplink secondary serving cell; a second determination unit arranged to determine an uplink serving cell having the lowest or highest carrier frequency other than the uplink primary serving cell as the PUCCH-carrying uplink secondary serving cell; a third determination unit arranged to determine an uplink serving cell having the maximum bandwidth other than the uplink primary serving cell as the PUCCH-carrying uplink secondary serving cell; a fourth determination unit arranged to determine an uplink serving cell having the carrier frequency closest to or farthest from the uplink primary serving cell as the PUCCH-carrying uplink secondary serving cell; and a fifth determination unit arranged to determine an uplink serving cell containing most uplink sub-frames in uplink and downlink configurations as the PUCCH-carrying uplink secondary serving cell in the case that aggregated serving cells are TDD serving cells.

Alternatively, the second determination module includes a sixth determination unit arranged to determine a first group of downlink serving cells as the first downlink serving cells, and determine a second group of downlink serving cells as the second downlink serving cells, herein the first group of downlink serving cells includes a downlink primary serving cell, and the second group of downlink serving cells includes a downlink serving cell corresponding to the PUCCH-carrying uplink secondary serving cell or a downlink serving cell meeting a predetermined uplink-downlink transmitting and receiving interval.

The second determination module further includes one of the following: a seventh determination unit arranged to execute a modulo-2 operation according to indexes of the downlink serving cells, determine that a downlink serving cell of which the remainder is 0 belongs to the first group of downlink serving cells, and determine that a downlink serving cell of which the remainder is 1 belongs to the second group of downlink serving cells; an eighth determination unit arranged to determine that a downlink serving cell having the minimum index in a plurality of aggregated downlink serving cells belongs to the first group of downlink serving cells, and determine that the other downlink serving cells belong to the second group of downlink serving cells; a ninth determination unit arranged to determine that downlink serving cells which are located in the same band as the downlink primary serving cell belong to the first group of downlink serving cells, and determine that the other downlink serving cells belong to the second group of downlink serving cells; and a tenth determination unit arranged to determine that downlink serving cells scheduled by the downlink primary serving cell in a cross-carrier manner belong to the first group of downlink serving cells, and determine that the other downlink serving cells belong to the second group of downlink serving cells.

Alternatively, the second determination module includes an eleventh determination unit arranged to determine the first group of downlink serving cells as the first downlink serving cells, and determine the second group of downlink serving cells as the second downlink serving cells, herein the first group of downlink serving cells and the second group of downlink serving cells are determined according to the following preset rule: the downlink primary serving cell, downlink serving cells not corresponding to uplink serving cells and downlink serving cells corresponding to uplink serving cells are sequentially numbered as 0-N, herein N is a positive integer, downlink serving cells numbered as $0 \sim \lceil N/2 \rceil - 1$ belong to the first group of downlink serving cells, and the other numbered downlink serving cells belong to the second group of downlink serving cells; a twelfth determination unit arranged to determine, in the case that the number of uplink serving cells corresponding to the second group of downlink serving cells is one, determine that uplink serving cell as the PUCCH-carrying uplink secondary serving cell; and a thirteenth determination unit arranged to determine, in the case that there are a plurality of uplink serving cells corresponding to the second group of downlink serving cells, one of the following uplink serving cells as the PUCCH-carrying uplink secondary serving cell: an uplink serving cell corresponding to a downlink serving cell having the minimum or maximum number in the plurality of uplink serving cells; an uplink serving cell having the minimum or maximum index number in the plurality of uplink serving cells; an uplink serving cell having the highest or lowest carrier frequency in the plurality of uplink serving cells; an uplink serving cell having the maximum bandwidth in the plurality of uplink serving cells; and an uplink serving cell having the carrier frequency closest to or furthest from the uplink primary serving cell in the plurality of uplink serving cells.

Alternatively, the second determination module is further arranged to determine the first group of downlink serving cells as the first downlink serving cells, and determine the second group of downlink serving cells as the second downlink serving cells, herein the first group of downlink serving cells and the second group of downlink serving cells are determined according to the following preset rule: in the case that the aggregated downlink serving cells include the TDD serving cells and FDD serving cells, it is determined that the first group of downlink serving cells and the second group of downlink serving cells include one or the other of the TDD serving cells or the FDD serving cells, respectively.

Alternatively, the apparatus further includes a third receiving module arranged to receive and configure RRC layer configuration parameters of the PUCCH-carrying uplink secondary serving cell, herein the configuration parameters include at least one of the following: simultaneousAckNackAndCQI, simultaneousAckNackAndCQI-format3, and ackNackSRS-SimultaneousTransmission.

Alternatively, the apparatus further includes a third determination module arranged to determine that one of the RRC layer configuration parameters simultaneousAckNackAndCQI-format3 corresponding to the uplink primary serving cell and the uplink secondary serving cell for sending the PUCCH is enabled while the other one is not enabled; and a second sending module arranged to simultaneously send HARQ-ACK and CSI on the PUCCH of the uplink serving cell of which simultaneousAckNackAndCQI-format3 is not enabled, put, in the case that only the HARQ-ACK is sent on the PUCCH of the uplink serving cell of which simultaneousAckNackAndCQI-format3 is enabled, P-CSI needing to be sent on the serving cell of which simultaneousAckNackAndCQI-format3 is not enabled on the serving cell of which simultaneousAckNackAndCQI-format3 is enabled, and simultaneously send the P-CSI and the HARQ-ACK.

The present embodiment further provides a base station including any one of the foregoing apparatuses for configuring the uplink control channel.

The present embodiment further provides a user equipment including any one of the foregoing apparatuses for configuring the uplink control channel.

The modules and units involved in the embodiment of the present disclosure may be implemented in a software manner, or may be implemented in a hardware manner. The modules and units described in the embodiment of the present disclosure may also be disposed in a processor. For example, the apparatus shown in FIG. 2 may be described as a processor includes a first receiving module 22 and a first sending module 23. Names of these modules do not form limitations to the modules themselves in certain case. For example, the first receiving module 22 may also be described as "a module arranged to receive a message sent by a base station".

In order to make the technical scheme and implementation method of the present disclosure clearer, its implementation process will be described in detail below in conjunction with an alternative embodiment.

An alternative embodiment provides a method for sending and receiving an uplink control channel, a terminal, and a base station. The alternative embodiment relates to an LTE-Advanced system, and more specifically to a method for sending and receiving an uplink control channel in the LTE-Advanced system during carrier aggregation, a terminal, and a base station.

An alternative embodiment provides a method for configuring a sending mode for an uplink control channel, including: sending, by a base station, signaling to a terminal, herein the signaling is used for configuring a sending mode for a physical uplink control channel (PUCCH) of the terminal.

Further, the sending mode for uplink control information includes: sending the uplink control channel only on an uplink PCell, and sending the uplink control channel on the uplink PCell and an uplink SCell.

Further, when the sending mode for the uplink control channel in which the uplink control channel is sent on the uplink PCell and the uplink serving SCell is used, the base station informs the terminal of PUCCH-carrying uplink SCell information and downlink serving cell information corresponding to a PUCCH-carrying uplink PCell and uplink SCell respectively through one of the following manners:

manner 1: a signaling manner;
manner 2: a predefined manner; and
manner 3: a manner combining the signaling manner with the predefined manner.

Manner 3 means that a part of the uplink SCell information and the downlink serving cell information corresponding to the PUCCH-carrying uplink PCell and uplink SCell respectively is determined through manner 1 while the other part is determined through manner 2.

Further, when the signaling manner is used, the base station indicates an SCell index of the PUCCH-carrying uplink SCell and the downlink serving cell information corresponding to the PUCCH-carrying uplink PCell and uplink SCell respectively through RRC layer signaling or MAC layer signaling.

For example, the RRC layer signaling or the MAC layer signaling for the downlink serving cell information corresponding to the PUCCH-carrying uplink PCell and uplink SCell respectively adopts the following manner: creating a bitmap, herein the size of the bitmap is equal to the number of downlink serving cells assigned to the terminal, and each bit in the bitmap is used for indicating whether uplink control information of a downlink serving cell corresponding to the bit is sent on the uplink PCell or the uplink SCell.

Further, when the predefined manner is used, the PUCCH-carrying uplink SCell is:

(1) an uplink serving cell having the minimum or maximum index number in the serving cells other than the uplink PCell according a predefined SCell indication rule 1;

(2) an uplink serving cell having the lowest or highest carrier frequency other than the uplink PCell according to a predefined SCell indication rule 2;

(3) an uplink serving cell having the maximum bandwidth other than the uplink PCell according to a predefined SCell indication rule 3;

(4) an uplink serving cell having the carrier frequency closest to or farthest from the uplink PCell according to a predefined SCell indication rule 4; and (5) a serving cell containing most uplink sub-frames in uplink and downlink configurations when aggregated serving cells are TDD serving cells according to a predefined SCell indication rule 5.

Further, when the predefined manner is used, the downlink serving cell information corresponding to the PUCCH-carrying uplink PCell and uplink SCell respectively is determined by:

dividing the downlink serving cells assigned to the terminal into two groups, group 0 corresponding to the uplink PCell, and group 1 corresponding to the PUCCH-carrying uplink SCell, herein downlink PCells belong to group 0, and downlink serving cells corresponding to the PUCCH-carrying uplink SCell or downlink serving cells meeting a predetermined uplink-downlink transmitting and receiving interval belong to group 1, and whether other downlink serving cells (when the number of the aggregated downlink serving cells is greater than 2) belong to group 0 or group 1 is determined by one of the following:

(1) a predefined grouping rule 1: a modulo-2 operation is executed according to indexes of serving cells, a downlink serving cell of which the remainder is 0 belongs to group 0, and a downlink serving cell of which the remainder is 1 belongs to group 1;

(2) a predefined grouping rule 2: when there is only one serving cell, the serving cell belongs to group 1; when there are two serving cells, a serving cell having a lower index belongs to group 0, and the other one belongs to group 1; and when there are three serving cells, a serving cell having the lowest index belongs to group 0, and the other two belong to group 1;

(3) a predefined grouping rule 3: downlink serving cells located in the same band as the downlink PCell belong to group 0, and the other downlink serving cells belong to group 1; and (4) a predefined grouping rule 4: downlink serving cells scheduled by the downlink PCell in a cross-carrier manner belong to group 0, and the other downlink serving cells belong to group 1.

Further, when the predefined manner is used, the PUCCH-carrying uplink serving cell information and the downlink serving cell information corresponding to the PUCCH-carrying uplink PCell and uplink SCell respectively are determined by:

numbering the downlink serving cells assigned to the terminal in the following sequence: first the downlink PCell, then downlink serving cells not corresponding to uplink serving cells, and finally downlink serving cells corresponding to uplink serving cells. Suppose that there are N downlink serving cells in total, they are sequentially numbered as 0, 1, . . . , N−1 starting from the PCell, the downlink serving cells numbered as 0~⌊N/2⌋−1 are taken as group 0 corresponding to the uplink PCell, and other numbered downlink serving cells are taken as group 1. When there is only one uplink serving cell corresponding to the downlink serving cells in group 1, this uplink serving cell is the PUCCH-carrying uplink SCell. When there are more than one uplink serving cells corresponding to the downlink serving cells in group 1, the PUCCH-carrying uplink SCell is: an uplink serving cell corresponding to a downlink serving cell having the minimum or maximum number in the uplink serving cells; or an uplink serving cell having the minimum or maximum index number in the uplink serving cells; or an uplink serving cell having the highest or lowest carrier frequency in the uplink serving cells; or an uplink serving cell having the maximum bandwidth in the uplink serving cells; or an uplink serving cell having the carrier frequency closest to or furthest from the uplink PCell in the uplink serving cells.

Further, when the predefined manner is used, the PUCCH-carrying uplink SCell information and the downlink serving cell information corresponding to the PUCCH-carrying uplink PCell and uplink SCell respectively are determined through the following manner:

when the aggregated serving cells are TDD and FDD aggregated serving cells, TDD serving cells are divided into a group, and FDD serving cells are divided into a group.

Further, when the manner combining the signaling manner with the predefined manner is used, the PUCCH-carrying uplink SCell information and the downlink serving cell information corresponding to the PUCCH-carrying uplink PCell and uplink SCell respectively are determined through one of the following manners.

(1) The PUCCH-carrying uplink SCell is indicated by signaling, and the downlink SCell information corresponding to the PUCCH-carrying uplink PCell and uplink SCell respectively is determined through one of the foregoing predefined manners.

(2) The PUCCH-carrying uplink SCell is determined through one of the foregoing predefined manners, and the downlink serving cell information corresponding to the PUCCH-carrying uplink PCell and uplink SCell respectively is determined according to the foregoing signaling manner.

Further, when the uplink control channel transmission mode configured by the base station in which the uplink control channel is sent on the uplink PCell and the uplink SCell is used, relevant parameters required to send the PUCCH on the uplink SCell may be determined through the following manners.

(1) A set of PUCCH-config-SCell is additionally configured, and specifically used for sending the PUCCH on the uplink SCell.

(2) A PUCCH-config parameter configured by an existing protocol is applied to sending the PUCCH on the uplink SCell likewise, that is, the uplink PCell and the uplink SCell share a set of PUCCH-config parameters.

An alternative embodiment further provides another method for sending uplink control information, including: receiving, by a terminal, configuration information of a base station, and determining a sending mode for an uplink control channel.

Further, the sending mode for the uplink control channel includes: sending the uplink control channel only on an uplink PCell, and sending the uplink control channel on the uplink PCell and an uplink SCell.

Further, when the terminal determines that the sending mode for the uplink control channel in which the uplink control channel is sent on the uplink PCell and the uplink SCell is used, the terminal determines PUCCH-carrying uplink SCell information and downlink serving cell information corresponding to a PUCCH-carrying uplink PCell and uplink SCell respectively through one of the following manners:

manner 1: a signaling manner;
manner 2: a predefined manner; and
manner 3: a manner combining the signaling manner with the predefined manner.

Manner 3 means that a part of the uplink SCell information and the downlink serving cell information corresponding to the PUCCH-carrying uplink PCell and uplink SCell respectively is determined through manner 1 while the other part is determined through manner 2.

Further, when the predefined manner is used, the terminal determines the PUCCH-carrying uplink SCell according to a rule agreed with the base station, and the PUCCH-carrying uplink SCell may be one of the following:

(1) an uplink serving cell having the minimum or maximum index number in the serving cells other than the uplink PCell according a predefined SCell indication rule 1;

(2) an uplink serving cell having the lowest or highest carrier frequency other than the uplink PCell according to a predefined SCell indication rule 2;

(3) an uplink serving cell having the maximum bandwidth other than the uplink PCell according to a predefined SCell indication rule 3;

(4) an uplink serving cell having the carrier frequency closest to or farthest from the uplink PCell according to a predefined SCell indication rule 4; and (5) a serving cell containing most uplink sub-frames in uplink and downlink configurations when aggregated serving cells are TDD serving cells according to a predefined SCell indication rule 5.

Further, when the predefined manner is used, the terminal determines the downlink serving cell information corresponding to the PUCCH-carrying uplink PCell and uplink SCell respectively according to a rule agreed with the base station.

If group 0 corresponds to the uplink PCell and group 1 corresponds to the PUCCH-carrying uplink SCell, then a downlink PCell belongs to group 0, and a downlink serving cell corresponding to the PUCCH-carrying uplink SCell or a downlink serving cell meeting a predetermined uplink-downlink transmitting and receiving interval belongs to group 1, and whether the other downlink serving cells (when the number of aggregated downlink serving cells is greater than 2) belong to group 0 or group 1 is determined, through one of the following:

(1) a predefined grouping rule 1: a modulo-2 operation is executed according to indexes of serving cells, a downlink serving cell of which the remainder is 0 belongs to group 0, and a downlink serving cell of which the remainder is 1 belongs to group 1;

(2) a predefined grouping rule 2: when there is only one serving cell, the serving cell belongs to group 1; when there are two serving cells, a serving cell having a lower index belongs to group 0, and the other one belongs to group 1; and when there are three serving cells, a serving cell having the lowest index belongs to group 0, and the other two belong to group 1;

(3) a predefined grouping rule 3: downlink serving cells located in the same band as the downlink PCell belong to group 0, and the other downlink serving cells belong to group 1; and (4) a predefined grouping rule 4: downlink serving cells scheduled by the downlink PCell in a cross-carrier manner belong to group 0, and the other downlink serving cells belong to group 1.

Further, when the predefined manner is used, the terminal determines the PUCCH-carrying uplink SCell information and the downlink serving cell information corresponding to the PUCCH-carrying uplink PCell and uplink SCell respectively according to a rule agreed with the base station by:

numbering the downlink serving cells assigned to the terminal in the following sequence: first the downlink PCell, then downlink serving cells not corresponding to uplink serving cells, and finally downlink serving cells corresponding to uplink serving cells. Suppose that there are N downlink serving cells in total, they are sequentially numbered as 0, 1, . . . , N−1 starting from the PCell, the downlink serving cells numbered as 0~⌊N/2⌋−1 are taken as group 0 corresponding to the uplink PCell, and other numbered downlink serving cells are taken as group 1. When there is only one uplink serving cell corresponding to the downlink serving cells in group 1, this uplink serving cell is the PUCCH-carrying uplink SCell. When there are more than one uplink serving cells corresponding to the downlink serving cells in group 1, the PUCCH-carrying uplink SCell is: an uplink serving cell corresponding to a downlink serving cell having the minimum or maximum number in the uplink serving cells; or an uplink serving cell having the minimum or maximum index number in the uplink serving cells; or an uplink serving cell having the highest or lowest carrier frequency in the uplink serving cells; or an uplink serving cell having the maximum bandwidth in the uplink serving cells; or an uplink serving cell having the carrier frequency closest to or furthest from the uplink PCell in the uplink serving cells.

Further, when the predefined manner is used, the PUCCH-carrying uplink SCell information and the downlink serving cell information corresponding to the PUCCH-carrying uplink PCell and uplink SCell respectively are determined through the following manner:

when the aggregated serving cells are TDD and FDD aggregated cells, TDD serving cells are divided into a group, and FDD serving cells are divided into a group.

Further, when a manner combining the signaling manner with the predefined manner is used, the terminal determines the PUCCH-carrying uplink SCell information and the downlink serving cell information corresponding to the PUCCH-carrying uplink PCell and uplink SCell respectively through one of the following manners.

(1) The PUCCH-carrying uplink SCell is determined by signaling, and the downlink SCell information corresponding to the PUCCH-carrying uplink PCell and uplink SCell respectively is determined through one of the foregoing predefined manners.

(2) The PUCCH-carrying uplink SCell is determined through one of the foregoing predefined manners, and the downlink serving cell information corresponding to the PUCCH-carrying uplink PCell and uplink SCell respectively is determined according to the signaling.

Further, when the terminal determines that the sending mode for the uplink control channel in which the uplink control channel is sent on the uplink PCell and the uplink SCell, the terminal will not ignore the following RRC layer configuration parameters of the uplink SCell: simultaneousAckNackAndCQI, simultaneousAckNackAndCQI-format3, and ackNackSRS-Simultaneous Transmission.

Further, when the terminal determines that the sending mode for the uplink control channel in which the uplink control channel is sent on the uplink PCell and the uplink SCell and one of the RRC layer configuration parameters simultaneousAckNackAndCQI-format3 of the uplink PCell and the uplink SCell for sending the PUCCH is enabled while the other one is not enabled, and when the terminal needs to simultaneously send HARQ-ACK and CSI on the PUCCH of the uplink serving cell of which simultaneousAckNackAndCQI-format3 is not enabled and only needs to send the HARQ-ACK on the PUCCH of the uplink serving cell of which simultaneousAckNackAndCQI-format3 is enabled, P-CSI required be sent on the serving cell of which simultaneousAckNackAndCQI-format3 is not enabled may be put on the serving cell of which simultaneousAckNackAndCQI-format3 is enabled, and may be sent simultaneously together with the HARQ-ACK.

The technical schemes of the foregoing alternative embodiments will be further elaborated below in conjunction with the accompanying drawings. It should be noted that the embodiments of the present application and the features in the embodiments may be combined arbitrarily with each other in the case of no conflict.

It should be specifically noted that when aggregated serving cells are FDD serving cells, an uplink serving cell and a downlink serving cell are distinguished, and when the aggregated serving cells are TDD serving cells, the uplink serving cell and the downlink serving cell are the same serving cell. That is, for a TDD serving cell, an uplink PCell is also a downlink PCell. The same applies to the SCell.

Alternative Embodiment 1

Figure 3:
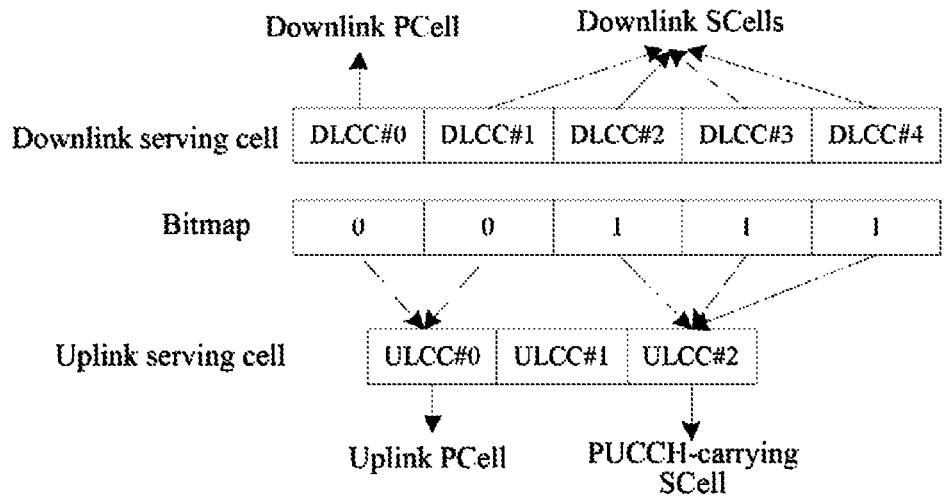
FIG. 3 is a schematic diagram of message configuration according to an alternative embodiment 1 of the present disclosure.

As shown in FIG. 3, a base station configures a terminal with five downlink serving cells and three uplink serving cells, and the base station sends a PUCCH on an uplink PCell and an uplink SCell while configuring the terminal. In the present embodiment, suppose that the base station indicates a PUCCH-carrying uplink SCell and downlink serving cells corresponding to the PUCCH-carrying uplink PCell and uplink SCell respectively through a signaling manner.

As shown in FIG. 3, the five configured downlink serving cells are DL CC#0~DL CC#4 respectively, herein DL CC#0 is the downlink PCell. The uplink serving cells are UL CC#0~UL CC#2, herein UL CC#0 is the uplink PCell. Because the base station sends the PUCCH on the uplink PCell and the uplink SCell while configuring the terminal and the terminal has determined the uplink PCell upon access, the base station only needs to additionally indicate on which SCell the PUCCH can be sent by the terminal. In the present embodiment, suppose that the base station indicates that UL CC#2 is the PUCCH-carrying uplink SCell by signaling. The signaling here may be RRC layer signaling or may be MAC layer signaling.

The base station further indicates the downlink serving cells corresponding to the PUCCH-carrying uplink PCell and uplink SCell respectively through the signaling by:

creating a bitmap, herein the bit width of the bitmap is identical to the number of downlink serving cells assigned to the terminal, namely 5 in this embodiment. Each bit in the bitmap is used for indicating whether the corresponding downlink serving cell corresponds to the uplink PCell or the uplink SCell. For example, a bit of "0" indicates that the downlink serving cell corresponds to the uplink PCell, and a bit of "1" indicates that the downlink serving cell corresponds to the uplink SCell. When the bitmap shown in FIG. 1 is created, it is indicated that the downlink serving cells DL CC#0 and DL CC#1 correspond to the uplink PCell and the downlink serving cells DL CC#2, DL CC#3 and DL CC#4 correspond to the uplink SCell.

What is worth mentioning is that the downlink serving cells being corresponding to the uplink PCell or the uplink SCell indicates that uplink control information of the downlink serving cells, including HARQ-ACK, CSI and SR, will be sent on the corresponding uplink PCell or uplink SCell (when there is no PUSCH to be sent).

Alternative Embodiment 2

Figure 4:
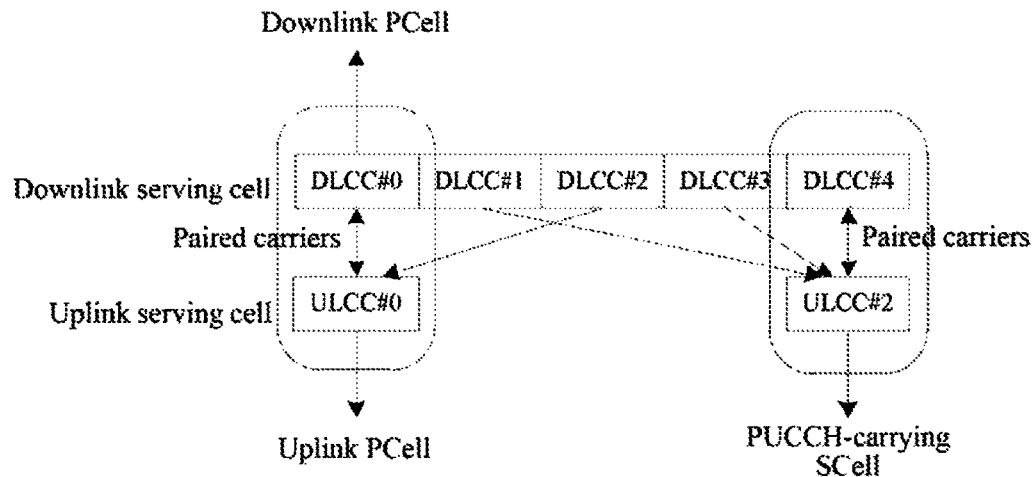
FIG. 4 is a schematic diagram 1 of message configuration according to an alternative embodiment 2 of the present disclosure.

As shown in FIG. 4, a base station configures a terminal with five downlink serving cells and two uplink serving cells, and the base station sends a PUCCH on an uplink PCell and an uplink SCell while configuring the terminal. In the present embodiment, suppose that the base station indicates a PUCCH-carrying uplink SCell and downlink serving cells corresponding to the PUCCH-carrying uplink PCell and uplink SCell respectively through a predefined manner.

In the present embodiment, since only two uplink serving cells, a PCell and an SCell, are configured, the SCell is the PUCCH-carrying SCell.

Because the uplink serving cells cannot independently appear, their corresponding downlink serving cells must be configured while the uplink serving cells are configured. In the present embodiment, the uplink PCell corresponds to the downlink PCell, and the uplink SCell corresponds to the downlink serving cell DL CC#4, thus the downlink PCell belongs to group 0, and DL CC#4 belongs to group 1.

Figure 5:
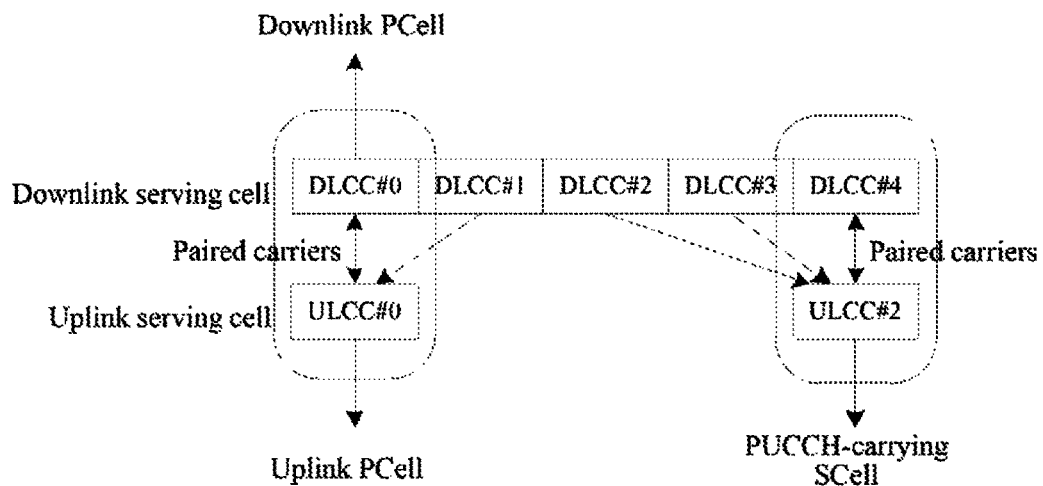
FIG. 5 is a schematic diagram 2 of message configuration according to an alternative embodiment 2 of the present disclosure.
Figure 6:
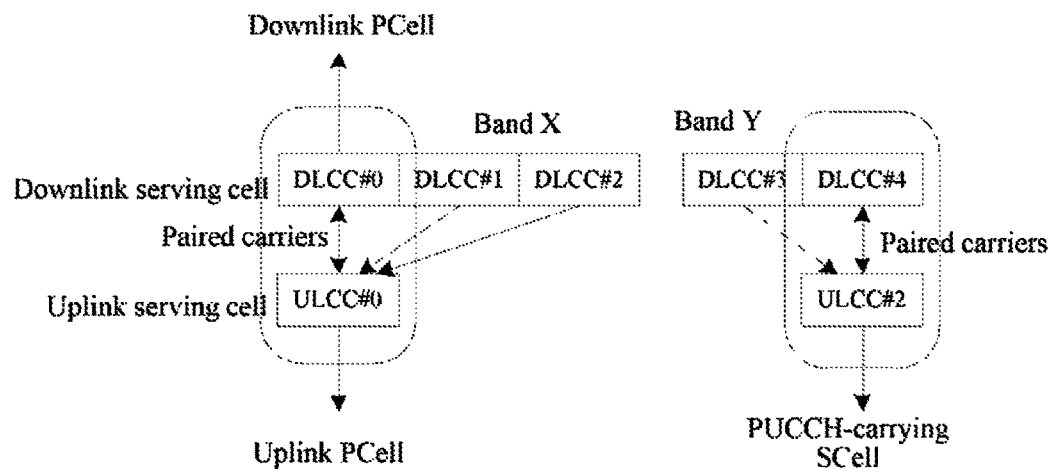
FIG. 6 is a schematic diagram 3 of message configuration according to an alternative embodiment 2 of the present disclosure.
Figure 7:
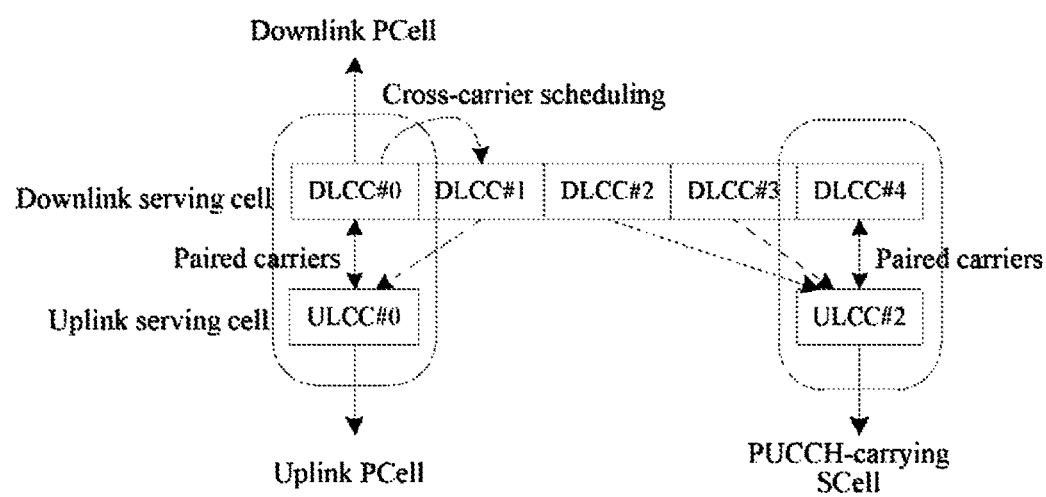
FIG. 7 is a schematic diagram 4 of message configuration according to an alternative embodiment 2 of the present disclosure.

Suppose that serving cell indexes (SCellIndex) of DL CC#1, DL CC#2 and DL CC#3 are 1, 2, 3 in sequence, and at the same time suppose that DL CC#1 and DL CC#2 are located in the same band as DL CC#0, DL CC#3 is located in the same band as DL CC#4, DL CC#1 is scheduled by the PCell in a cross-carrier manner, and DL CC#2 and DL CC#3 are not scheduled by the PCell in the cross-carrier manner, then when grouped according to a predefined rule 1, DL CC#1 and DL CC#3 belong to group 1, and DL CC#2 belongs to group 0, as shown in FIG. 4 specifically;

when grouped according to a predefined rule 2, DL CC#1 belongs to group 0, and DL CC#2 and DL CC#3 belong to group 1, as shown in FIG. 5 specifically;

when grouped according to a predefined rule 3, because DL CC#1, DL CC#2 and PCell all belong to a band X, DL CC#1 and DL CC#2 belong to group 0, and because DL CC#3 and DL CC#4 belong to a band Y, DL CC#3 belongs to group 1, as shown in FIG. 6; and when grouped according to a predefined rule 4, because DL CC#1 is scheduled by the downlink PCell in the cross-carrier manner, DL CC#1 belongs to group 0, and because DL CC#2 and DL CC#3 are not scheduled by the downlink PCell in the cross-carrier manner, DL CC#2 and DL CC#3 belong to group 1, as shown in FIG. 7.

Alternative Embodiment 3

Figure 8:
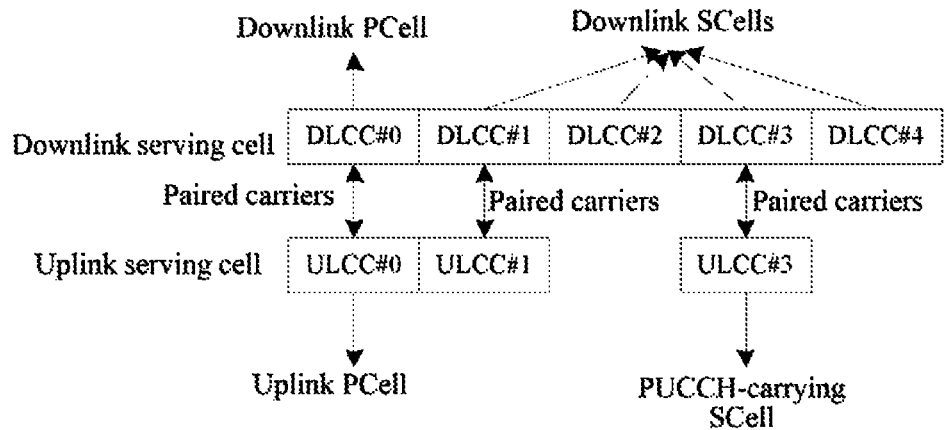
FIG. 8 is a schematic diagram of message configuration according to an alternative embodiment 3 of the present disclosure.

As shown in FIG. 8, a base station configures a terminal with five downlink serving cells and three uplink serving cells, and the base station sends a PUCCH on an uplink PCell and an uplink SCell while configuring the terminal. In the present embodiment, suppose that the base station indicates a PUCCH-carrying uplink SCell and downlink serving cells corresponding to the PUCCH-carrying uplink PCell and uplink SCell respectively through a predefined manner.

In the present embodiment, in the five configured downlink serving cells, uplink serving cells corresponding to a downlink PCell (DL CC#0), DL CC#1 and DL CC#3 are UL CC#0, UL CC#1 and UL CC#2, respectively, and DL CC#2 and DL CC#4 are both separate downlink serving cells.

Suppose that serving cell indexes (SCellIndex) of the three uplink serving cells other than the PCell are 1 and 3, respectively, and suppose that the carrier frequencies of the three uplink serving cells UL CC#0, UL CC#1 and UL CC#3 are increased in sequence, and the uplink bandwidths of UL CC#1 and UL CC#3 are 15 MHz and 20 MHz, respectively.

When a predefined SCell indication rule 1 of the present disclosure is used, if an uplink serving cell having the minimum index number in the serving cells other than the uplink PCell is indicated, UL CC#1 is the PUCCH-carrying uplink SCell; and if an uplink serving cell having the maximum index number in the serving cells other than the uplink PCell is indicated, UL CC#3 is the PUCCH-carrying uplink SCell.

When a predefined SCell indication rule 2 of the present disclosure is used, if an uplink serving cell having the lowest carrier frequency other than the uplink PCell is indicated, UL CC#1 is the PUCCH-carrying uplink SCell; and if an uplink serving cell having the highest carrier frequency in the serving cells other than the uplink PCell is indicated, UL CC#3 is the PUCCH-carrying uplink SCell.

When a predefined SCell indication rule 3 of the present disclosure is used, if an uplink serving cell having the maximum bandwidth other than the uplink PCell is indicated, UL CC#3 is the PUCCH-carrying uplink SCell.

When a predefined SCell indication rule 4 of the present disclosure is used, if an uplink serving cell having the carrier frequency closest to the uplink PCell is indicated, UL CC#1 is the PUCCH-carrying uplink SCell; and if an uplink serving cell having the carrier frequency furthest from the uplink PCell is indicated, UL CC#3 is the PUCCH-carrying uplink SCell.

The downlink serving cells corresponding to the PUCCH-carrying uplink PCell and uplink SCell may be indicated by using the method described in the preferred embodiment 2, and will not be repeated herein.

Alternative Embodiment 4

Figure 9:
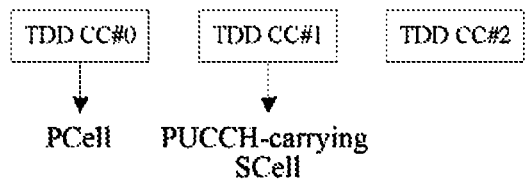
FIG. 9 is a schematic diagram of message configuration according to an alternative embodiment 4 of the present disclosure.

As shown in FIG. 9, a base station configures a terminal with three TDD serving cells, and the base station sends a PUCCH on a PCell and an SCell while configuring the terminal. In the present embodiment, suppose that the base station indicates a PUCCH-carrying uplink SCell and downlink serving cells corresponding to the PUCCH-carrying uplink PCell and uplink SCell respectively through a predefined manner. In the present embodiment, three TDD serving cells are configured, herein CC#0 is the PCell.

When uplink and downlink configurations of the three TDD serving cells are the same, the PUCCH-carrying SCell may be indicated by using the method described in the alternative embodiment 3, and will not be repeated herein. When the uplink and downlink configurations of the three TDD serving cells are different, for example, if the uplink and downlink configurations of the three serving cells are configuration 0, configuration 1 and configuration 2, the PUCCH-carrying uplink SCell may be determined according to a predefined SCell indication rule 5 of the present disclosure. That is, if a serving cell having most uplink sub-frames is contained in the uplink and downlink configurations, TDD CC#1 is the PUCCH-carrying uplink SCell.

Alternative Embodiment 5

Figure 10:
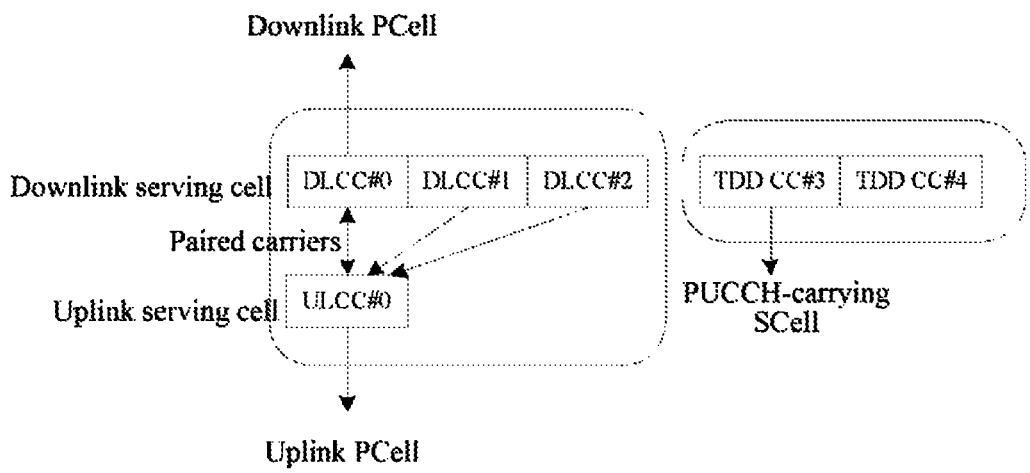
FIG. 10 is a schematic diagram of message configuration according to an alternative embodiment 5 of the present disclosure.

As shown in FIG. 10, a base station configures a terminal with three FDD serving cells and two TDD serving cells, and the base station sends a PUCCH on a PCell and an SCell while configuring the terminal. In the present embodiment, suppose that the base station indicates a PUCCH-carrying uplink SCell and downlink serving cells corresponding to the PUCCH-carrying uplink PCell and uplink SCell respectively through a predefined manner. In the present embodiment, FDD serving cells DL CC#0 and UL CC#0 are the PCell.

According to a predefined serving cell grouping rule of the present disclosure, when TDD and FDD serving cells are aggregated, the TDD serving cells are divided into a group, and the FDD serving cells are divided into a group. FDD serving cells DL CC#0 to DL CC#2 are divided into a group, and belong to group 0 because the FDD serving cells are the PCell. TDD serving cells CC#3 and CC#4 belong to group 1. The PUCCH-carrying SCell in group 1 may be indicated by using the method described in the alternative embodiment 4, and will not be repeated herein.

Alternative Embodiment 6

Figure 11:
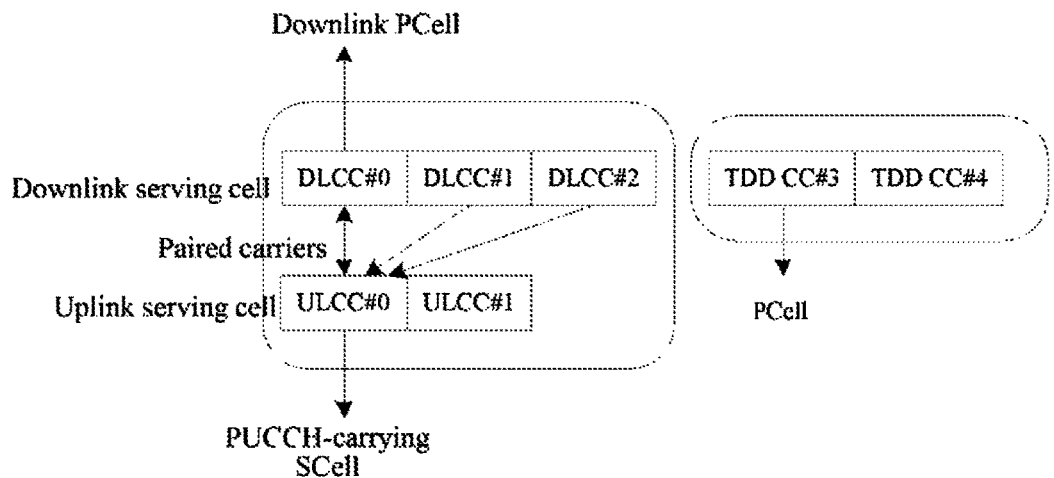
FIG. 11 is a schematic diagram of message configuration according to an alternative embodiment 6 of the present disclosure.

As shown in FIG. 11, a base station configures a terminal with three FDD serving cells and two TDD serving cells, and the base station sends a PUCCH on a PCell and an SCell while configuring the terminal. In the present embodiment, suppose that the base station indicates a PUCCH-carrying uplink SCell and downlink serving cells corresponding to the PUCCH-carrying uplink PCell and uplink SCell respectively through a predefined manner. In the present embodiment, FDD serving cell DL CC#3 is the PCell.

According to a predefined serving cell grouping rule of the present disclosure, when TDD and FDD serving cells are aggregated, the TDD serving cells are divided into a group, and the FDD serving cells are divided into a group. FDD serving cells DL CC#0 to DL CC#2 are divided into a group, and belong to group 0 because the FDD serving cells are the PCell. FDD serving cells DL CC#0, DL CC#1 and DL CC#2 belong to group 1, and UL CC#0 and UL CC#1 also belong to group 1. The PUCCH-carrying SCell in group 1 may be indicated by using the method described in the alternative embodiment 3, and will not be repeated herein.

Alternative Embodiment 7

Figure 12:
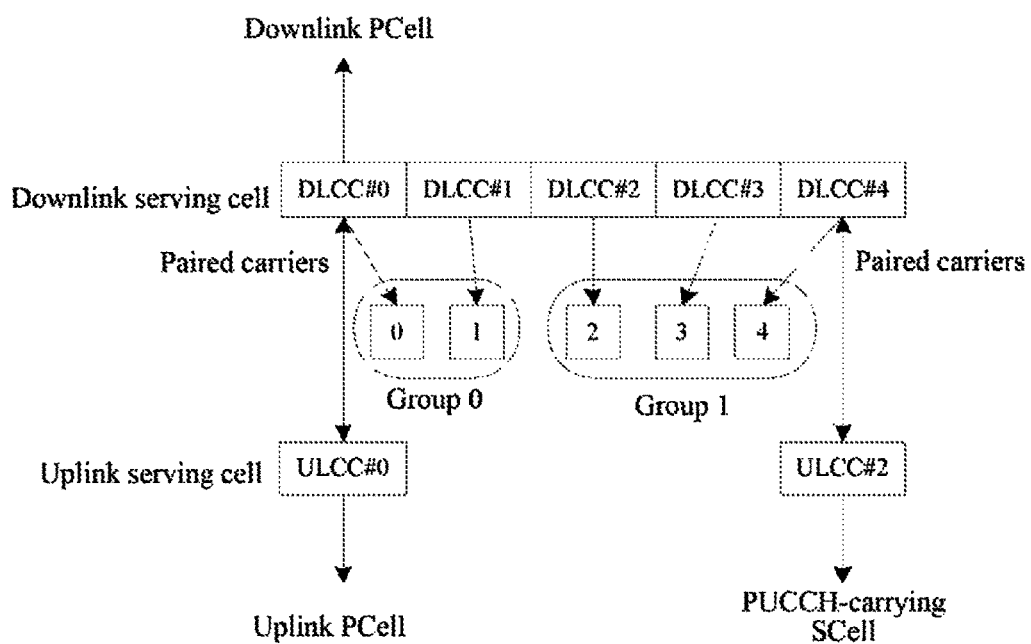
FIG. 12 is a schematic diagram of message configuration according to an alternative embodiment 7 of the present disclosure.

As shown in FIG. 12, a base station configures a terminal with three downlink serving cells and two uplink serving cells, and the base station sends a PUCCH on an uplink PCell and an uplink SCell while configuring the terminal. In the present embodiment, suppose that the base station indicates a PUCCH-carrying uplink SCell and downlink serving cells corresponding to the PUCCH-carrying uplink PCell and uplink SCell respectively through a predefined manner.

In the present embodiment, in the five configured downlink serving cells, the downlink PCell and DL CC#4 have their corresponding uplink serving cells, and DL CC#1, DL CC#2 and DL CC#3 are separate downlink serving cells. The downlink serving cells are numbered in order of first the downlink PCell, then the separate downlink serving cells and finally downlink serving cells corresponding to uplink serving cells, to obtain the numbers of the downlink serving cells shown in FIG. 8.

Then, the downlink serving cells numbered as $\{0, 1, \ldots \lfloor N/2 \rfloor -1\}$ are taken as group 0. In the present embodiment, N=5. Therefore, that is, the downlink serving cells numbered as $\{0,1\}$ are taken as group 0. Other serving cells are taken as group 1. That is, the downlink serving cells numbered as $\{2,3,4\}$ are taken as group 1. Because the downlink PCell is included in group 0, uplink control information corresponding to group 0 is sent on the uplink PCell. Because only DL CC#4 in group 1 has it corresponding uplink serving cell, uplink control information corresponding to group 1 is sent on UL CC#2.

Using the downlink serving cell grouping method of the present embodiment can ensure that two groups of downlink serving cells both contain at least one corresponding uplink serving cell, thereby implementing simultaneous sending of the PUCCH on the uplink PCell and SCell. For group 0, the PUCCH is sent on the PCell. For group 1, when the downlink serving cells in group 1 correspond to more than one uplink serving cell, the PUCCH-carrying uplink SCell is: an uplink serving cell corresponding to a downlink serving cell having the minimum or maximum number in the uplink serving cells; or an uplink serving cell having the minimum or maximum index number in the uplink serving cells; or an uplink serving cell having the highest or lowest carrier frequency in the uplink serving cells; or an uplink serving cell having the maximum bandwidth in the uplink serving cells; or an uplink serving cell having the carrier frequency closest to or furthest from the uplink PCell in the uplink serving cells.

Alternative Embodiment 8

Figure 13:
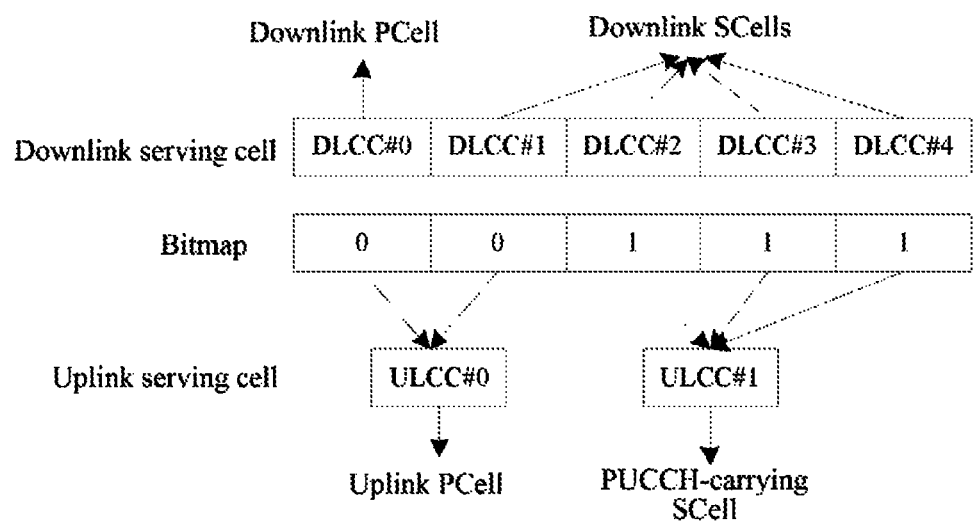
FIG. 13 is a schematic diagram of message configuration according to an alternative embodiment 8 of the present disclosure.

As shown in FIG. 13, a base station configures a terminal with five downlink serving cells and two uplink serving cells, and the base station sends a PUCCH on an uplink PCell and an uplink SCell while configuring the terminal. In the present embodiment, suppose that the base station indicates a PUCCH-carrying uplink SCell and downlink serving cells corresponding to the PUCCH-carrying uplink PCell and uplink SCell respectively through a manner combining the signaling manner with the predefined manner.

In the present embodiment, because there are only two uplink serving cells, both uplink serving cells are used for sending the PUCCH without needing additional signaling to indicate them. The downlink serving cells corresponding to the PUCCH-carrying uplink PCell and uplink SCell respectively are indicated by the signaling manner. The signaling indication manner is shown in the alternative embodiment 1, and will not be repeated herein.

Alternative Embodiment 9

In the existing protocol, there are various uplink channels/signals, including a PUCCH, a PUSCH and an SRS, and uplink control information includes HARQ-ACK, CSI and SR. The uplink control information may be sent on the PUCCH or may be sent on the PUSCH or may be sent on the PUCCH and the PUSCH simultaneously. Specifically, how to send the uplink channels/signals will be limited by the following RRC configuration parameters: simultaneousAck-NackAndCQI, simultaneousAckNackAndCQI-format3, and ackNackSRS-SimultaneousTransmission.

When the PUCCH is sent only on the uplink PCell, a terminal will ignore the foregoing three RRC configuration parameters.

When a base station configures the PUCCH to be sent on the uplink PCell and the uplink SCell simultaneously, the foregoing three configuration parameters are effective to the terminal, and should not be ignored.

Alternative Embodiment 10

In the existing protocol, relevant parameters during sending of a PUCCH are defined in PUCCH-config, and applied when the PUCCH is sent on an uplink PCell.

When a base station configures a user equipment to send the PUCCH on the uplink PCell and an uplink SCell simultaneously, the relevant parameters required to send the PUCCH on the uplink SCell may be determined by:

(1) configuring additionally a set of PUCCH-config-SCells, which are dedicated to sending the PUCCH on the uplink SCell; and (2) PUCCH-config parameters configured by the existing protocol, which are applied to sending the PUCCH on the uplink SCell likewise, that is, the uplink PCell and the uplink SCell share a set of PUCCH-config parameters.

Alternative Embodiment 11

When a terminal determines that a sending mode for an uplink control channel in which the uplink control channel is sent on an uplink PCell and an uplink SCell, suppose that an RRC layer configuration parameter simultaneousAck-NackAndCQI-format3 of the uplink PCell for sending the PUCCH is enabled while an RRC layer configuration parameter simultaneousAckNackAndCQI-format3 of the uplink SCell for sending the PUCCH is not enabled.

On a certain sub-frame, HARQ-ACK and P-CSI are required to be sent on the PUCCH on the uplink SCell simultaneously, at which point, because simultaneousAck-NackAndCQI-format3 of the uplink SCell is arranged to be not enabled, the terminal cannot simultaneously send the HARQ-ACK and the P-CSI on the PUCCH of the uplink SCell. The simultaneousAckNackAndCQI-format3 of the PUCCH on the uplink PCell is arranged to be enabled, and only the HARQ-ACK is required to be sent on the PUCCH of the uplink PCell on the current sub-frame, at which point, the P-CSI which could not be sent on the uplink SCell originally may be put on the uplink PCell to be sent, and the HARQ-ACK and the CSI are simultaneously sent on the PUCCH of the uplink PCell.

When the HARQ-ACK and the P-CSI are simultaneously sent on the PUCCH of the uplink PCell, the P-CSI on the SCell cannot be put on the uplink PCell to be sent, thus the PUCCH of the uplink PCell at this time cannot be borne.

In conclusion, through the foregoing embodiments of the present disclosure, the sending of the uplink control information on the uplink PCell or simultaneous sending of the uplink control information on the uplink PCell and the uplink SCell can be effectively supported. In addition, allowing the PUCCH to be sent on the SCell may bring the following advantages: the problem of overhead of the PUCCH of the PCell is alleviated, and HARQ-ACK binding operations are reduced, thereby facilitating improvement of the downlink throughput performance; CSI drop is reduced, such that the base station can obtain a timely and accurate CSI report, thereby facilitating improvement of the downlink throughput performance; and Round Trip Time (RTT) is shortened, which mainly aims at a scenario of TDD-FDD carrier aggregation.

Obviously, those skilled in the art should understand that various elements or steps of the present disclosure described above may be implemented by general-purpose computing devices that may be centralized on a single computing device or distributed over a network consisting of a plurality of computing devices. Alternatively, the elements or steps may be implemented by program codes executable by the computing devices such that they may be stored in storage devices and executed by the computing devices, or they may be made separately into individual integrated circuit elements, or some of them can be made into a single integrated circuit element. Thus, the present disclosure is not limited to any particular combination of hardware and software.

INDUSTRIAL APPLICABILITY

Through the embodiments of the present disclosure, a manner in which the base station sends the message configuring the sending mode for the physical uplink control channel (PUCCH) of the user equipment to the user equipment is used, so as to solve the problem in the conventional art that support for simultaneous sending of the PUCCH on the PCell and the SCell is not provided, thereby achieving the simultaneous sending of the PUCCH on the PCell and the SCell.

The above description is only alternative embodiments of the present disclosure and is not intended to limit the present disclosure. Those skilled in the art should understand that the present disclosure may have various changes and modifications. Any modification, equivalent substitution, improvement and the like made within the essence and principle of the present disclosure should be included in the protection scope of the present disclosure.

What we claim is:

1. A method for configuring an uplink control channel, comprising:
   sending, by a base station, a message to a user equipment, wherein the message is used for configuring a sending mode for a physical uplink control channel PUCCH of the user equipment,
   wherein the sending mode includes: a first sending mode in which the PUCCH is sent only on an uplink primary serving cell, and a second sending mode in which the PUCCH is sent on the uplink primary serving cell and an uplink secondary serving cell,
   wherein in a case that the sending mode for the PUCCH of the user equipment is configured as the second sending mode, the method further comprises:
   transferring, by the base station, PUCCH-carrying uplink secondary serving cell information, first downlink serving cell information corresponding to a PUCCH-carrying uplink primary serving cell, and second downlink serving cell information corresponding to a PUCCH-carrying uplink secondary serving cell to the user equipment; and/or
   determining, by the user equipment, the PUCCH-carrying uplink secondary serving cell, a first downlink serving cell corresponding to the PUCCH-carrying uplink primary serving cell, and a second downlink serving cell corresponding to the PUCCH-carrying uplink secondary serving cell according to a predefined rule,
   wherein transferring, by the base station, the uplink secondary serving cell information, the first downlink serving cell information and the second downlink serving cell information to the user equipment comprises:
   transferring, by the base station, the uplink secondary serving cell information, the first downlink serving cell information and the second downlink serving cell information to the user equipment through Radio Resource Control RRC layer signaling or Media Access Control MAC layer signaling, wherein the uplink secondary serving cell information includes index information of the uplink secondary serving cell,
   and
   wherein the base station transfers the first downlink serving cell information and the second downlink serving cell information to the user equipment by creating a bitmap in the RRC layer signaling or the MAC layer signaling, wherein a size of the bitmap is equal to a number of downlink serving cells assigned to the user equipment, and each bit in the bitmap is used for indicating whether uplink control information of a downlink serving cell corresponding to the bit is sent on the uplink primary serving cell or the uplink secondary serving cell.

2. The method according to claim 1, wherein in a case that the sending mode for the PUCCH of the user equipment is configured as the second sending mode, the method further comprises:

transferring, by the base station, the PUCCH-carrying uplink secondary serving cell information to the user equipment, and determining, by the user equipment, the first downlink serving cell corresponding to the PUCCH-carrying uplink primary serving cell and the second downlink serving cell corresponding to the PUCCH-carrying uplink secondary serving cell according to the predefined rule; or transferring, by the base station, the first downlink serving cell information corresponding to the PUCCH-carrying uplink primary serving cell and the second downlink serving cell information corresponding to the PUCCH-carrying uplink secondary serving cell to the user equipment, and determining, by the user equipment, the PUCCH-carrying uplink secondary serving cell according to the predefined rule.

3. The method according to claim 1, wherein in a case that the sending mode for the PUCCH of the user equipment is configured as the second sending mode, the method further comprises:

configuring, by the base station, parameters for the user equipment which are required by the user equipment to send the PUCCH on the uplink secondary serving cell, wherein the parameters include a newly configured PUCCH-config-SCell parameter dedicated to sending the PUCCH on the uplink secondary serving cell or an existing PUCCH-config parameter shared by the uplink primary serving cell and the uplink secondary serving cell.

4. A method for sending an uplink control channel, comprising:

receiving, by a user equipment, a message sent by a base station, wherein the message is used for indicating a sending mode for a physical uplink control channel PUCCH of the user equipment, the sending mode includes: a first sending mode in which the PUCCH is sent only on an uplink primary serving cell, and a second sending mode in which the PUCCH is sent on the uplink primary serving cell and an uplink secondary serving cell; and sending, by the user equipment, the uplink control channel according to the sending mode for the PUCCH indicated by the message, wherein in a case that the sending mode for the PUCCH of the user equipment is configured as the second sending mode, the method further comprises:

receiving, by the user equipment, PUCCH-carrying uplink secondary serving cell information, first downlink serving cell information corresponding to a PUCCH-carrying uplink primary serving cell, and second downlink serving cell information corresponding to a PUCCH-carrying uplink secondary serving cell, sent by the base station; and/or determining, by the user equipment, the PUCCH-carrying uplink secondary serving cell, a first downlink serving cell corresponding to the PUCCH-carrying uplink primary serving cell, and a second downlink serving cell corresponding to the PUCCH-carrying uplink secondary serving cell according to a predefined rule, wherein receiving, by the user equipment, the PUCCH-carrying uplink secondary serving cell information, the first downlink serving cell information and the second downlink serving cell information sent by the base station comprises:

receiving, by the user equipment, the uplink secondary serving cell information, the first downlink serving cell information and the second downlink serving cell information sent by the base station through Radio Resource Control RRC layer signaling or Media Access Control MAC layer signaling, wherein the uplink secondary serving cell information includes index information of the uplink secondary serving cell, and wherein the user equipment acquires the first downlink serving cell information and the second downlink serving cell information by creating a bitmap in the RRC layer signaling or the MAC layer signaling, wherein a size of the bitmap is equal to a number of downlink serving cells assigned to the user equipment, and each bit in the bitmap is used for indicating whether uplink control information of a downlink serving cell corresponding to the bit is sent on the uplink primary serving cell or the uplink secondary serving cell.

5. The method according to claim 4, wherein determining, by the user equipment, the PUCCH-carrying uplink secondary serving cell according to the predefined rule comprises one of the following:

determining, by the user equipment, an uplink serving cell having a minimum or maximum index number other than the uplink primary serving cell as the PUCCH-carrying uplink secondary serving cell;

determining, by the user equipment, an uplink serving cell having a lowest or highest carrier frequency other than the uplink primary serving cell as the PUCCH-carrying uplink secondary serving cell;

determining, by the user equipment, an uplink serving cell having a maximum bandwidth other than the uplink primary serving cell as the PUCCH-carrying uplink secondary serving cell;

determining, by the user equipment, an uplink serving cell having a carrier frequency closest to or farthest from the uplink primary serving cell as the PUCCH-carrying uplink secondary serving cell; and determining, by the user equipment, an uplink serving cell containing most uplink sub-frames in uplink and downlink configurations as the PUCCH-carrying uplink secondary serving cell in a case that aggregated serving cells are Time Division Duplexing TDD serving cells, or, wherein determining, by the user equipment, the first downlink serving cell and the second downlink serving cell according to the predefined rule comprises:

determining, by the user equipment, a first group of downlink serving cells as the first downlink serving cells, and determining a second group of downlink serving cells as the second downlink serving cells, wherein the first group of downlink serving cells include a downlink primary serving cell, and the second group of downlink serving cells include a downlink serving cell corresponding to the PUCCH-carrying uplink secondary serving cell or a downlink serving cell meeting a predetermined uplink-downlink transmitting and receiving interval;

in a case that a number of aggregated downlink serving cells is greater than 2, the method further comprises:

determining a downlink serving cell belonging to the first group of downlink serving cells or the second group of downlink serving cells according to one of the following preset rules:

executing a modulo-2 operation is executed according to an index of a downlink serving cell; determining that a downlink serving cell of which a remainder is 0 belongs to the first group of downlink serving cells, and that a downlink serving cell of which a remainder is 1 belongs to the second group of downlink serving cells;

determining that a downlink serving cell having a minimum index in a plurality of aggregated downlink serving cells belongs to the first group of downlink serving cells, and that the other downlink serving cells belong to the second group of downlink serving cells;

determining that a downlink serving cell which is located in the same band as the downlink primary serving cell belongs to the first group of downlink serving cells, and that the other downlink serving cells belong to the second group of downlink serving cells; and determining that a downlink serving cell scheduled by the downlink primary serving cell in a cross-carrier manner belongs to the first group of downlink serving cells, and that the other downlink serving cells belong to the second group of downlink serving cells, or, wherein determining, by the user equipment, the PUCCH-carrying uplink secondary serving cell, the first downlink serving cell and the second downlink serving cell according to the predefined rule comprises:

determining, by the user equipment, the first group of downlink serving cells as the first downlink serving cells, and determining the second group of downlink serving cells as the second downlink serving cells, wherein the first group of downlink serving cells and the second group of downlink serving cells are determined according to the following preset rule: the downlink primary serving cell, downlink serving cells not corresponding to uplink serving cells and downlink serving cells corresponding to uplink serving cells are sequentially numbered as 0-N, wherein N is a positive integer, downlink serving cells numbered as 0~⌊N/2⌋−1 belong to the first group of downlink serving cells, and the other numbered downlink serving cells belong to the second group of downlink serving cells;

in a case that a number of uplink serving cells corresponding to the second group of downlink serving cells is one, determining that uplink serving cell as the PUCCH-carrying uplink secondary serving cell; and in a case that there are a plurality of uplink serving cells corresponding to the second group of downlink serving cells, determining one of the following uplink serving cells as the PUCCH-carrying uplink secondary serving cell: an uplink serving cell corresponding to a downlink serving cell having a minimum or maximum number in the plurality of uplink serving cells; an uplink serving cell having a minimum or maximum index number in the plurality of uplink serving cells; an uplink serving cell having a highest or lowest carrier frequency in the plurality of uplink serving cells; an uplink serving cell having a maximum bandwidth in the plurality of uplink serving cells; and an uplink serving cell having the carrier frequency closest to or furthest from the uplink primary serving cell in the plurality of uplink serving cells, or, wherein determining, by the user equipment, the PUCCH-carrying uplink secondary serving cell, the first downlink serving cell and the second downlink serving cell according to the predefined rule comprises:

determining, by the user equipment, the first group of downlink serving cells as the first downlink serving cells, and determining the second group of downlink serving cells as the second downlink serving cells, wherein the first group of downlink serving cells and the second group of downlink serving cells are determined according to the following preset rule: in a case that the aggregated downlink serving cells comprise TDD serving cells and Frequency Division Duplexing FDD serving cells, determining that the first group of downlink serving cells and the second group of downlink serving cells comprise one or the other of the TDD serving cells or the FDD serving cells, respectively.

6. The method according to claim 4, wherein in a case that the sending mode for the PUCCH of the user equipment is configured as the second sending mode, the method further comprises:

receiving, by the user equipment, RRC layer configuration parameters of the PUCCH-carrying uplink secondary serving cell, wherein the configuration parameters include at least one of the following: an ACK/NACK and CQI simultaneous transmission configuration parameter simultaneousAckNackAndCQI, a format3-based ACK/NACK and CQI simultaneous transmission configuration parameter simultaneousAckNackAndCQI-format3, and an ACK/NACK and SRS simultaneous transmission configuration parameter ackNack-SRS-SimultaneousTransmission, or, wherein in a case that the sending mode for the PUCCH of the user equipment is configured as the second sending mode, the method further comprises:

determining, by the user equipment, that one of the RRC layer configuration parameters simultaneousAckNackAndCQI-format3 corresponding to the uplink primary serving cell and the uplink secondary serving cell respectively for sending the PUCCH is enabled while the other one is not enabled;

in a case that both HARQ-ACK and CSI needs to be sent on the PUCCH of the uplink serving cell of which simultaneousAckNackAndCQI-format3 is not enabled and only the HARQ-ACK needs to be sent on the PUCCH of the uplink serving cell of which simultaneousAckNackAndCQI-format3 is enabled, putting, by the user equipment, P-CSI needing to be sent on the serving cell of which simultaneousAckNackAndCQI-format3 is not enabled on the serving cell of which simultaneousAckNackAndCQI-format3 is enabled, and simultaneously sending the P-CSI and the HARQ-ACK on the serving cell of which simultaneousAckNackAndCQI-format3 is enabled.

7. An apparatus for configuring an uplink control channel, comprising a processor and a storage device, wherein the storage device stores processor-executable programs, and the programs comprise:

a sending module arranged to send a message from a base station to a user equipment, wherein the message is used for configuring a sending mode for a physical uplink control channel PUCCH of the user equipment, wherein the sending mode includes: a first sending mode in which the PUCCH is sent only on an uplink primary serving cell, and a second sending mode in which the PUCCH is sent on the uplink primary serving cell and an uplink secondary serving cell, wherein the programs further comprise:

a transferring module arranged to transfer PUCCH-carrying uplink secondary serving cell information, first downlink serving cell information corresponding to a PUCCH-carrying uplink primary serving cell, and second downlink serving cell information corresponding to a PUCCH-carrying uplink secondary serving cell to the user equipment, and wherein the transferring module is further arranged to:

transfer the uplink secondary serving cell information, the first downlink serving cell information and the second downlink serving cell information to the user equipment through Radio Resource Control RRC layer signaling or Media Access Control MAC layer signaling, wherein the uplink secondary serving cell information includes index information of the uplink secondary serving cell, and wherein the transferring module is further arranged to:

transfer the first downlink serving cell information and the second downlink serving cell information to the user equipment by creating a bitmap in the RRC layer signaling or the MAC layer signaling, wherein a size of the bitmap is equal to a number of downlink serving cells assigned to the user equipment, and each bit in the bitmap is used for indicating whether uplink control information of a downlink serving cell corresponding to the bit is sent on the uplink primary serving cell or the uplink secondary serving cell.

8. The apparatus according to claim 7, wherein the programs further comprise:

a configuration module arranged to configure parameters for the user equipment which are required by the user equipment to send the PUCCH on the uplink secondary serving cell, wherein the parameters include a newly configured PUCCH-config-SCell parameter dedicated to sending the PUCCH on the uplink secondary serving cell or an existing PUCCH-config parameter shared by the uplink primary serving cell and the uplink secondary serving cell.

9. An apparatus for sending an uplink control channel, comprising a processor and a storage device, wherein the storage device stores processor-executable programs, and the programs comprise:

a first receiving module arranged to receive a message sent by a base station, wherein the message is used for indicating a sending mode for a physical uplink control channel (PUCCH) of the user equipment, the sending mode includes: a first sending mode in which the PUCCH is sent only on an uplink primary serving cell, and a second sending mode in which the PUCCH is sent on the uplink primary serving cell and an uplink secondary serving cell; and a first sending module arranged to send the uplink control channel according to the sending mode for the PUCCH indicated by the message, wherein the programs further comprise:

a second receiving module arranged to receive PUCCH-carrying uplink secondary serving cell information, first downlink serving cell information corresponding to a PUCCH-carrying uplink primary serving cell, and second downlink serving cell information corresponding to a PUCCH-carrying uplink secondary serving cell, sent by the base station; and/or a second determination module arranged to determine the PUCCH-carrying uplink secondary serving cell, a first downlink serving cell corresponding to the PUCCH-carrying uplink primary serving cell, and a second downlink serving cell corresponding to the PUCCH-carrying uplink secondary serving cell according to a predefined rule, and wherein the second receiving module is further arranged to:

receive the uplink secondary serving cell information, the first downlink serving cell information and the second downlink serving cell information sent by the base station through Radio Resource Control RRC layer signaling or Media Access Control MAC layer signaling, wherein the uplink secondary serving cell information includes index information of the uplink secondary serving cell, and wherein the second receiving module is further arranged to:

acquire the first downlink serving cell information and the second downlink serving cell information by creating a bitmap in the RRC layer signaling or the MAC layer signaling, wherein a size of the bitmap is equal to a number of downlink serving cells assigned to the user equipment, and each bit in the bitmap is used for indicating whether uplink control information of a downlink serving cell corresponding to the bit is sent on the uplink primary serving cell or the uplink secondary serving cell.

10. The apparatus according to claim 9, wherein the second determination module comprises one of the following:

a first determination unit arranged to determine an uplink serving cell having a minimum or maximum index number other than the uplink primary serving cell as the PUCCH-carrying uplink secondary serving cell;

a second determination unit arranged to determine an uplink serving cell having a lowest or highest carrier frequency other than the uplink primary serving cell as the PUCCH-carrying uplink secondary serving cell;

a third determination unit arranged to determine an uplink serving cell having a maximum bandwidth other than the uplink primary serving cell as the PUCCH-carrying uplink secondary serving cell;

a fourth determination unit arranged to determine an uplink serving cell having a carrier frequency closest to or farthest from the uplink primary serving cell as the PUCCH-carrying uplink secondary serving cell; and a fifth determination unit arranged to determine an uplink serving cell containing most uplink sub-frames in uplink and downlink configurations as the PUCCH-carrying uplink secondary serving cell in a case that aggregated serving cells are Time Division Duplexing TDD serving cells, a sixth determination unit arranged to determine a first group of downlink serving cells as the first downlink serving cells, and determine a second group of downlink serving cells as the second downlink serving cells, wherein the first group of downlink serving cells include a downlink primary serving cell, and the second group of downlink serving cells include a downlink serving cell corresponding to the PUCCH-carrying uplink secondary serving cell or a downlink serving cell meeting a predetermined uplink-downlink transmitting and receiving interval; and a seventh determination unit arranged to execute a modulo-2 operation according to an index of a downlink serving cell, determine that a downlink serving cell of which a remainder is 0 belongs to the first group of downlink serving cells, and determine that a downlink serving cell of which a remainder is 1 belongs to the second group of downlink serving cells;
an eighth determination unit arranged to determine that a downlink serving cell having a minimum index in a plurality of aggregated downlink serving cells belongs to the first group of downlink serving cells, and determine that the other downlink serving cells belong to the second group of downlink serving cells;
a ninth determination unit arranged to determine that a downlink serving cell which is located in the same band as the downlink primary serving cell belongs to the first group of downlink serving cells, and determine that the other downlink serving cells belong to the second group of downlink serving cells; and
a tenth determination unit arranged to determine that a downlink serving cell scheduled by the downlink primary serving cell in a cross-carrier manner belongs to the first group of downlink serving cells, and determine that the other downlink serving cells belong to the second group of downlink serving cells,
an eleventh determination unit arranged to determine the first group of downlink serving cells as the first downlink serving cells, and determine the second group of downlink serving cells as the second downlink serving cells, wherein the first group of downlink serving cells and the second group of downlink serving cells are determined according to the following preset rule: the downlink primary serving cell, downlink serving cells not corresponding to uplink serving cells and downlink serving cells corresponding to uplink serving cells are sequentially numbered as 0-N, wherein N is a positive integer, downlink serving cells numbered as 0~⌊N/2⌋−1 belong to the first group of downlink serving cells, and the other numbered downlink serving cells belong to the second group of downlink serving cells;
a twelfth determination unit arranged to determine, in a case that a number of uplink serving cells corresponding to the second group of downlink serving cells is one, determine that uplink serving cell as the PUCCH-carrying uplink secondary serving cell; and
a thirteenth determination unit arranged to determine, in a case that there are a plurality of uplink serving cells corresponding to the second group of downlink serving cells, one of the following uplink serving cells as the PUCCH-carrying uplink secondary serving cell: an uplink serving cell corresponding to a downlink serving cell having a minimum or maximum number in the plurality of uplink serving cells; an uplink serving cell having a minimum or maximum index number in the plurality of uplink serving cells; an uplink serving cell having a highest or lowest carrier frequency in the plurality of uplink serving cells; an uplink serving cell having a maximum bandwidth in the plurality of uplink serving cells; and an uplink serving cell having the carrier frequency closest to or furthest from the uplink primary serving cell in the plurality of uplink serving cells, or,
wherein the second determination module is further arranged to:
determine the first group of downlink serving cells as the first downlink serving cells, and determine the second group of downlink serving cells as the second downlink serving cells, wherein the first group of downlink serving cells and the second group of downlink serving cells are determined according to the following preset rule: in a case that the aggregated downlink serving cells comprise TDD serving cells and Frequency Division Duplexing FDD serving cells, determining that the first group of downlink serving cells and the second group of downlink serving cells comprise one or the other of the TDD serving cells or the FDD serving cells, respectively.

11. The apparatus according to claim 9, wherein the programs further comprise:
a third receiving module arranged to receive and configure RRC layer configuration parameters of the PUCCH-carrying uplink secondary serving cell, wherein the configuration parameters include at least one of the following: an ACK/NACK and CQI simultaneous transmission configuration parameter simultaneousAckNackAndCQI, a format3-based ACK/NACK and CQI simultaneous transmission configuration parameter simultaneousAckNackAndCQI-format3, and an ACK/NACK and SRS simultaneous transmission configuration parameter ackNackSRS-SimultaneousTransmission,
and,
wherein the programs further comprise:
a third determination module arranged to determine that one of the RRC layer configuration parameters simultaneousAckNackAndCQI-format3 corresponding to the uplink primary serving cell and the uplink secondary serving cell respectively for sending the PUCCH is enabled while the other one is not enabled; and
a second sending module arranged to, put, in a case that both HARQ-ACK and CSI needs to be sent on the PUCCH of the uplink serving cell of which simultaneousAckNackAndCQI-format3 is not enabled and only the HARQ-ACK needs to be sent on the PUCCH of the uplink serving cell of which simultaneousAckNackAndCQI-format3 is enabled, P-CSI needing to be sent on the serving cell of which simultaneousAckNackAndCQI-format3 is not enabled on the serving cell of which simultaneousAckNackAndCQI-format3 is enabled, and simultaneously send the P-CSI and the HARQ-ACK on the serving cell of which simultaneousAckNackAndCQI-format3 is enabled.

12. A base station, comprising the apparatus for configuring an uplink control channel according to claim 7.

13. A User Equipment UE, comprising the apparatus for sending an uplink control channel according to claim 9.

* * * * *